US010558780B1

(12) United States Patent
Kukal et al.

(10) Patent No.: US 10,558,780 B1
(45) Date of Patent: Feb. 11, 2020

(54) METHODS, SYSTEMS, AND COMPUTER PROGRAM PRODUCT FOR IMPLEMENTING SCHEMATIC DRIVEN EXTRACTED VIEWS FOR AN ELECTRONIC DESIGN

(71) Applicant: Cadence Design Systems, Inc., San Jose, CA (US)

(72) Inventors: Taranjit Singh Kukal, New Delhi (IN); Arnold Jean Marie Gustave Ginetti, Antibes (FR); Jagdish Lohani, Ghaziabad (IN); Harmohan Singh, New Delhi (IN); Ritabrata Bhattacharya, New Delhi (IN); Balvinder Singh, Faridabad (IN)

(73) Assignee: Cadence Design Systems, Inc., San Jose, CA (US)

( * ) Notice: Subject to any disclaimer, the term of this patent is extended or adjusted under 35 U.S.C. 154(b) by 181 days.

(21) Appl. No.: 15/721,845

(22) Filed: Sep. 30, 2017

(51) Int. Cl.
*G06F 17/50* (2006.01)
*H05K 3/00* (2006.01)

(52) U.S. Cl.
CPC ...... *G06F 17/5081* (2013.01); *G06F 17/5022* (2013.01); *G06F 17/5068* (2013.01); *H05K 3/0005* (2013.01); *G06F 17/504* (2013.01); *G06F 17/5009* (2013.01); *G06F 17/5036* (2013.01); *G06F 2217/02* (2013.01); *G06F 2217/74* (2013.01)

(58) Field of Classification Search
None
See application file for complete search history.

(56) References Cited

U.S. PATENT DOCUMENTS

| 6,236,956 | B1  | 5/2001  | Mantooth |
| 6,366,874 | B1  | 4/2002  | Lee |
| 6,865,725 | B2  | 3/2005  | Dickey |
| 7,089,512 | B2  | 8/2006  | Iadanza |
| 7,120,893 | B2  | 10/2006 | Sasaki |
| 7,159,202 | B2* | 1/2007  | Lee .................. G06F 17/505 |
|           |     |         | 716/103 |
| 7,206,731 | B2* | 4/2007  | Sercu ................ G06F 17/5036 |
|           |     |         | 703/14 |
| 7,418,683 | B1  | 8/2008  | Sonnard |
| 7,451,069 | B2  | 11/2008 | Moosburger |

(Continued)

OTHER PUBLICATIONS

Non-Final Office Action dated May 31, 2019 for U.S. Appl. No. 15/721,853.

(Continued)

*Primary Examiner* — Leigh M Garbowski
(74) *Attorney, Agent, or Firm* — Vista IP Law Group, LLP

(57) ABSTRACT

Disclosed are methods, systems, and articles of manufacture for implementing schematic driven extracted views for an electronic design. These techniques identify a schematic circuit component design represented by a schematic symbol from a schematic design and identifying layout device information from a layout of the electronic design. An extracted view is generated anew or updated from an existing extracted view at least by placing and interconnecting a symbol in the schematic design based at least in part upon the layout device information. The electronic design may be further updated based in part or in whole upon results of performing one or more analyses on the extracted view.

20 Claims, 18 Drawing Sheets

(56) References Cited

U.S. PATENT DOCUMENTS

| | | | |
|---|---|---|---|
| 8,176,463 B2 | 5/2012 | O'Riordan | |
| 8,209,650 B2 * | 6/2012 | St. John | G06F 17/5063 716/101 |
| 8,261,228 B1 * | 9/2012 | Gopalakrishnan | G06F 17/5081 703/14 |
| 8,584,072 B1 * | 11/2013 | Gopalakrishnan | G06F 17/5081 716/111 |
| 8,612,921 B1 * | 12/2013 | Gopalakrishnan | G06F 17/5081 716/111 |
| 8,656,329 B1 | 2/2014 | Kukal | |
| 8,689,169 B2 | 4/2014 | Fischer | |
| 8,707,230 B1 * | 4/2014 | Hu | G06F 17/5036 716/110 |
| 8,726,207 B2 * | 5/2014 | Jiang | G06F 17/5068 716/110 |
| 8,732,636 B2 | 5/2014 | Ginetti | |
| 8,732,640 B1 | 5/2014 | Krishnan | |
| 8,762,906 B2 | 6/2014 | Ginetti | |
| 8,782,577 B2 | 7/2014 | Fischer | |
| 9,223,915 B1 | 12/2015 | Ginetti | |
| 9,245,073 B2 * | 1/2016 | Fu | G06F 17/5045 |
| 9,280,621 B1 | 3/2016 | Ginetti | |
| 9,286,421 B1 | 3/2016 | Kukal | |
| 9,317,638 B1 | 4/2016 | Banka | |
| 9,342,647 B2 * | 5/2016 | Chen | G06F 17/5081 |
| 9,390,218 B2 * | 7/2016 | Lee | G06F 17/5081 |
| 9,449,130 B1 | 9/2016 | Kukal | |
| 9,645,715 B1 | 5/2017 | Jain | |
| 9,779,193 B1 * | 10/2017 | Ginetti | G06F 17/5045 |
| 9,798,840 B1 * | 10/2017 | Ginetti | G06F 17/5081 |
| 9,881,119 B1 * | 1/2018 | Kukal | G06F 17/5036 |
| 10,078,715 B2 * | 9/2018 | Sendig | G06F 17/5077 |
| 10,102,324 B2 * | 10/2018 | Oriordan | G06F 17/5077 |
| 10,289,793 B1 | 5/2019 | Kukal | |
| 2004/0111688 A1 * | 6/2004 | Lee | G06F 17/505 716/103 |
| 2007/0094622 A1 * | 4/2007 | Lee | G06F 17/505 716/103 |
| 2007/0233443 A1 | 10/2007 | Lai | |
| 2008/0244501 A1 * | 10/2008 | Davison | G06F 17/5045 716/104 |
| 2011/0035203 A1 | 2/2011 | Dalton | |
| 2015/0269297 A1 * | 9/2015 | Tuan | G06F 17/5036 716/106 |
| 2016/0125115 A1 * | 5/2016 | Strang | G06F 17/5045 716/116 |
| 2017/0169146 A1 * | 6/2017 | Chen | G06F 17/5036 |
| 2017/0169156 A1 * | 6/2017 | Perez | G06F 17/5063 |
| 2017/0249400 A1 * | 8/2017 | Oriordan | G06F 17/5077 |
| 2017/0249410 A1 | 8/2017 | Baker | |
| 2017/0255742 A1 * | 9/2017 | Lee | H01L 27/115 |

OTHER PUBLICATIONS

Notice of Allowance dated Jun. 27, 2019 for U.S. Appl. No. 15/721,851.

Final Office Action dated Sep. 19, 2019 for U.S. Appl. No. 15/721,853.

* cited by examiner

METHODS, SYSTEMS, AND COMPUTER PROGRAM PRODUCT FOR IMPLEMENTING SCHEMATIC DRIVEN EXTRACTED VIEWS FOR AN ELECTRONIC DESIGN

CROSS REFERENCE TO RELATED APPLICATIONS

This U.S. patent application is cross related to U.S. patent application Ser. No. 15/721,851 filed concurrently and entitled "METHODS, SYSTEMS, AND COMPUTER PROGRAM PRODUCT FOR IMPLEMENTING A NET AS A TRANSMISSION LINE MODEL IN A SCHEMATIC DRIVEN EXTRACTED VIEW FOR AN ELECTRONIC DESIGN" and U.S. patent application Ser. No. 15/721,853 filed concurrently and entitled "METHODS, SYSTEMS, AND COMPUTER PROGRAM PRODUCT FOR BINDING AND BACK ANNOTATING AN ELECTRONIC DESIGN WITH A SCHEMATIC DRIVEN EXTRACTED VIEW". The contents of the aforementioned U.S. patent applications are hereby expressly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavioral descriptions of the IC device and translates this high-level design language into netlists of various levels of abstraction. Essentially, the process to implement an electronic device begins with functional design and verification (e.g., using RTL), and then proceeds to physical design of a layout and verification.

Circuit designers and verification engineers use different methods to verify circuit designs. One common method of verification is the use of simulation. Simulation dynamically verifies a design by monitoring behaviors of the design with respect to test stimuli. For many types of designs, simulation can and should be performed during the design process to ensure that the ultimate goals are achievable and will be realized by the finished product.

SPICE is a common type of simulator that is used to simulate and verify the operation of an electronic design. With SPICE, the electronic design is converted into a system of equation(s), which is then solved for a given set of inputs to check the state of specific portions of the circuit at given points in time. For many circuit designs, this process can be a very computationally expensive and time-consuming effort, especially given the size and complexity of modern circuit designs.

Conventional approaches for simulations, especially for board level simulations (e.g., simulations performed on an electronic system including the printed circuit board or PCB, one or more integrated circuit (IC) chips, and IC packaging thereof) often extract a static simulation view from the finished layout by identifying a corresponding schematic symbol from the schematic symbol library for each of a plurality of layout circuit devices. As a result, these simulation views are often termed layout extracted views or simply extracted views. The electronic design may then undergo multiple rounds of changes to the schematic, the layout, or both the schematic and the layout after the initial simulation has been performed with a simulation view extracted from the initial layout.

When these changes occur at the schematic level, these conventional approaches require a designer to implement the changes in the schematic of the electronic design, push these schematic changes to create an updated layout with a layout editor, and then extract an updated simulation view with the updated layout. The simulator may then perform another round of simulation with the updated simulation view. This loop not only requires much more time and computational resources but also presents multiple other problems.

For example, modern electronic design may include devices having distributed pins, vector pins, etc. that may be represented as an input pin in the schematic symbol. During a simulation of, for example, an electronic design with a distributed Vcc having multiple Vcc pins for a distributed power network, this distributed Vcc may be schematically represented as a single Vcc pin in the corresponding schematic symbol. In this example, if the simulation result for the Vcc shows abnormal behavior the designer will need to guess which Vcc pin or Vcc pins are causing the abnormal behavior or perform some trial-and-error changes to identify the true cause of the abnormal behavior. Similar problems and hence challenges also arise for vector pins which may be even more difficult to troubleshoot and identify the root source of any abnormal behavior simulation result due to the multiplicity of the pins.

Another problem with these conventional approaches is that the extracted view from a layout is a static view. These simulation views are generated by traversing a layout to identify layout component designs and devices, identify a corresponding schematic symbol for each of the layout component designs, place the schematic symbol in the simulation view, and interconnect the schematic symbols by referencing the layout connectivity. Although these simulation views may in some cases appear to be identical or substantially similar to the original schematic from which the layout is generated, these simulation views or extracted views may not be editable as the original schematic. As a result, any changes at the schematic level must go through the aforementioned schematic edit, layout edit, and re-extraction.

Moreover, these simulation views are often generated for the simulation engines and thus do not appear as readable or understandable by designers. More importantly, these extracted views are generated as a flat view having a single hierarchy that includes all the schematic symbols or models understood by the simulation engine. As a result, an extracted view loses the hierarchical structures of the electronic designs; and the loss of the hierarchical structure further exacerbates the difficulties in understanding or manipulating such an extracted view, even if the extracted view were to be editable.

Another problem with conventional approaches is that the same schematic symbol may correspond to multiple schematic instances in the schematic design and hence multiple layout instances in the layout. During the generation of an extracted view from the layout in conventional approaches, these multiple layout instances may be extracted and represented as the same schematic symbol whereas these multiple layout instances may not necessarily be identically implemented in the layout. For example, two or more of these multiple layout instances may be routed differently although then all correspond to the same schematic symbol. As a result, conventional simulation views cannot correct capture the differences in, for example, parasitics and/or electrical characteristics between these layout instances.

Thus, what are needed are methods, systems, and computer program products for implementing a schematic driven extracted views for various analysis modules or simulation engines in a more efficient and effective manner and to address at least the aforementioned issues and shortcomings.

SUMMARY

Disclosed are method(s), system(s), and article(s) of manufacture for implementing schematic driven extracted views for an electronic design in one or more embodiments. Some embodiments are directed at a method for implementing schematic driven extracted views for an electronic design.

In some embodiments, these techniques identify a schematic circuit component design represented by a schematic symbol from a schematic design and identifying layout device information from a layout of the electronic design. An extracted view is generated anew or updated from an existing extracted view at least by placing and interconnecting a symbol in the schematic design based at least in part upon the layout device information. The electronic design may be further updated based in part or in whole upon results of performing one or more analyses on the extracted view.

In some embodiments, generating or updating the extracted view may include representing a first set of schematic circuit component designs with a set of schematic symbols in the extracted view. In addition, the set of schematic symbols may be interconnected in the extracted view with schematic connectivity information or layout connectivity information.

In some of these embodiments, a second set of schematic circuit component designs may be represented with a set of models in the extracted view; and the set of models may be interconnected in the extracted view with the layout connectivity information but not the schematic connectivity information.

In some embodiments, updating the electronic design includes identifying a circuit component design in the extracted view to be excluded from the one or more analyses; and a determination may be made to decide whether excluding the circuit component design from the one or more analyses is appropriate based at least in part upon one or more models residing in the extracted view.

In some of the immediately preceding embodiments, electrical behaviors of the electronic design may be determined at least by performing at least one analysis of the one or more analyses on the extracted view that excludes the circuit component design from the at least one analysis. In addition or in the alternative, a layout-versus-schematic (LVS) check may be performed with the extracted view and a layout of the electronic design; or a schematic-versus-schematic (SVS) check may be performed with the extracted view and the schematic design of the electronic design.

In some of these embodiments, the extracted view may be modified into a modified extracted view without regenerating the modified extracted view from the layout; or model annotations or waveforms may be presented in the extracted view or in the modified extracted view.

In some embodiments, generating or updating the extracted view includes identifying a graphical representation for representing the schematic circuit component design in the extracted view. A structure for the extracted view may be determined; and the extracted view may be generated anew or updated from an existing extracted view based in part or in whole upon the graphical representation or upon the structure of the extracted view.

In some embodiments, identifying the graphical representation may include determining whether a schematic symbol of the schematic circuit component design of the schematic design is to be placed in the extracted view based in part or in whole upon the layout device information. When the schematic symbol of the schematic circuit component design of the schematic design is determined not to be placed in the extracted view, a copy of the schematic symbol may be generated; and the copy may be modified into a modified schematic symbol based in part or in whole upon the layout device information. In the alternative, a new schematic symbol may be generated for the schematic circuit component design based in part or in whole upon the layout device information.

To determine the structure of the extracted view, a layout hierarchical structure of a layout of the electronic design may be identified; a layout hierarchy at which a layout circuit component design corresponding to the schematic circuit component design is located may be identified from the layout hierarchical structure; and the structure of the extracted view may be determined based in part or in whole upon the layout hierarchical structure and the layout hierarchy.

In the alternative, a schematic hierarchical structure of the schematic design of the electronic design may be identified; a schematic hierarchy at which the schematic circuit component design is located may be identified from the schematic hierarchical structure; and the structure of the extracted view may be determined based in part or in whole upon the schematic hierarchical structure and the schematic hierarchy.

To generate or update the extracted view based in part or in whole upon the graphical representation or upon the structure of the extracted view, a schematic master cell corresponding to the schematic circuit component design may be identified; a plurality of schematic instances that are instantiated in the schematic design may be identified from the schematic master cell; a plurality of layout instances corresponding to the plurality of schematic instances and comprising a plurality of different physical implementations may be identified in a layout of the electronic design; and one or more characteristics contributing to the plurality of different physical implementations of the plurality of layout instances may also be identified.

In some of these embodiments, a plurality of different models may be generated anew or identified from preexisting models for the plurality of different physical implementations based in part or in whole upon the one or more characteristics; and the plurality of schematic instances in the schematic design may be replaced with the plurality of different models at least by referencing connectivity information that comprises schematic connectivity information or layout connectivity information.

In addition or in the alternative, a mapping data structure between at least two of the extracted view, the schematic design, the layout, the plurality of different models, the plurality of schematic instances, or the plurality of layout instances may be generated. Moreover, one or more changes made in one of the extracted view, the schematic design, the layout, the plurality of different models, the plurality of schematic instances, or the plurality of layout instances may be automatically populated into another one of the extracted view, the schematic design, the layout, the plurality of different models, the plurality of schematic instances, or the plurality of layout instances based at least in part or in whole upon the mapping data structure.

In some of the immediately preceding embodiments, one or more subsequent changes in the extracted view after the extracted view has been generated may be identified. These one or more subsequent changes may be committed to a persistent data structure; and the one or more subsequent changes in the extracted view may be automatically populated to the schematic design or to the layout after the one or more subsequent changes have been committed to the persistent data structure.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
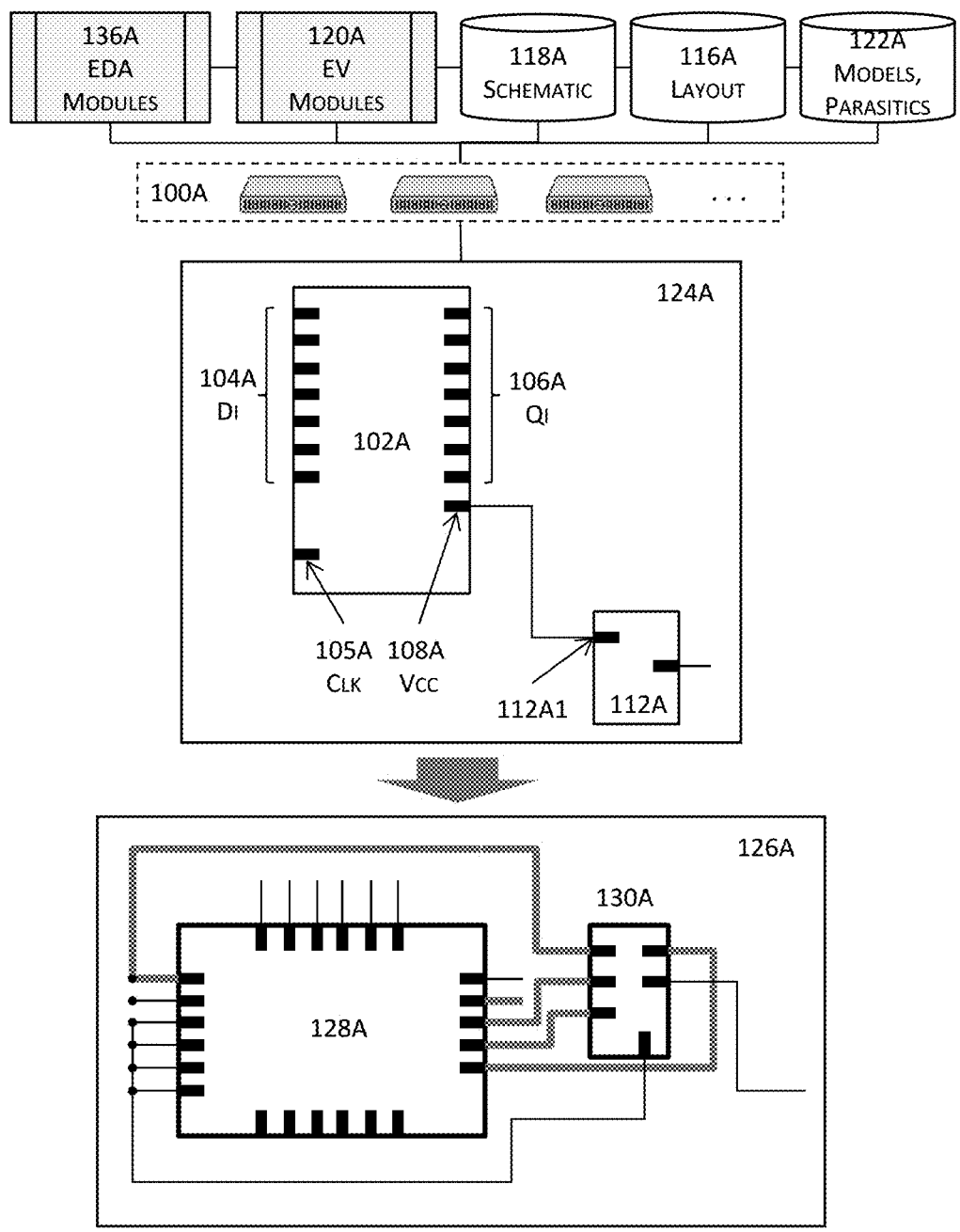
FIG. 1A illustrates a high level block diagram of a simplified system for implementing schematic driven extracted views for an electronic design in one or more embodiments.

Various techniques are directed to implementing schematic driven extracted views for an electronic design in various embodiments. Rather than deriving an extracted view from a layout of an electronic design, various embodiments start with the schematic design of the electronic design, identify or generate one or more models such as one or more s-parameter models, one or more IBIS (Input output Buffer Information Specification model) models, one or more SPICE (Simulation Program with Integrated Circuit Emphasis) sub-circuits, or any combinations thereof, etc. These one or more models may be identified or generated with some information extracted from a corresponding layout of the electronic design with the aid of one or more layout editors and/or estimated from a pre-layout exploration process without even invoking any layout editors. These one or more models include sufficient geometric and electrical information for an analysis module (e.g., a simulation engine) to compute or predict the electrical behavior of the underlying electronic design.

The original schematic circuit component designs to be represented as these one or more models may be removed from the schematic design (e.g., a copy of the master schematic design); and the one or more models may be placed in the schematic design. In some of these embodiments, these one or more models may even be placed according to the hierarchical structure of the original schematic circuit component designs to preserve the hierarchical structure in an extracted view.

Once placed in the schematic design, these one or more models may be interconnected with each other and/or with the remainder of the schematic design using schematic connectivity information and/or layout connectivity information. The interconnections may be represented as flight-line segments in some embodiments or orthogonal line segments in some other embodiments. The schematic design having these one or more interconnected models may then be stored as an extracted view for the electronic design. For example, an extracted view may be stored in volatile memory (e.g., random access memory) and may or may not necessarily be committed to disk. An extracted view thus includes sufficient information in the models for an analysis tool to compute or predict the electrical behavior of the underlying electronic design.

One of the advantages of various embodiments described herein is that extracted views no longer require the expensive elaboration and extraction from the layout(s). Some embodiments estimate the electrical and/or geometric information for the model with the pre-layout exploration, without even invoking the layout tool(s). This advantage is especially prominent when the electronic design spans across multiple design fabrics (e.g., the integrated circuit or IC design fabric, the IC packaging design fabric, the printed circuit board or PCB design fabric, the system design fabric, etc.)

Another advantage is that unlike conventional approaches that generate models for analyses or simulations in a textual format or in a flat, disorganized representation, an extracted view generated with various techniques described herein graphically resembles the original schematic design, with the exception of the original schematic circuit component designs being replaced with the corresponding model(s). In these embodiments, designers and users may still work with the extract view that at least graphically and aesthetically resemble the original schematic design that these designers and users are more familiar with.

Another advantage is that an extracted view may be associated with the one or more models therein, the corresponding schematic circuit component designs, the corresponding layout circuit component designs, and of course, the schematic design as well as the layout of the underlying electronic design. Because these models and hence the extracted views are generated from the schematic design to preserve the graphical appearance of the schematic design, a designer may perform, for example, preliminary analyses such as concept and feasibility analyses, what-if analyses, etc. directly by manipulating and modifying an extracted view and any of the models therein.

Unlike conventional approaches that generated non-editable or non-understandable models and extracted views (e.g., a textual SPICE netlist), these modifications to the extracted views and the models therein need not be populated in the corresponding layouts (assuming multiple design fabrics) unless these modifications change the layout topologies. Therefore, unlike conventional approaches that require populating schematic changes to the layouts and re-extracting the extracted view from the layouts, these techniques described herein provide the designers the capability to directly editing and modifying an extracted view, without invoking or having to invoke pertinent layout editors to conserve time and utilization of computational resources. Of course, designers may also freely modify an extracted view in such a way to alter the layout topology. In this case, the modifications may be pushed to the corresponding layout editors that implement the corresponding modifications to the layout topology. Nonetheless, re-extraction from the layout to regenerate the models for the extracted view may still be saved because extracted views are generated in a schematic driven manner in these embodiments.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level block diagram of a simplified system for implementing schematic driven extracted views for an electronic design in one or more embodiments. In these embodiments, a schematic design 124A may be provided to one or more computing systems 100A. These one or more computing systems 100A invoke various tools to generate an extracted view 126A for this schematic design 124A. More specifically, the original schematic design includes a first cell having a plurality of input pins 104A (Di) and a plurality of output pins 106A (Qi). The first cell further includes a clock pin 105A (CLK) as well as a Vcc pin 108A driving a second cell 112A at pin 121A1. The Vcc pin 108A may be represented in the schematic design as a single logical pin (108A) whereas the actual Vcc may include multiple physical Vcc pins.

These one or more computing systems 100A may invoke various modules to identify (if already existing) or determine (if non-existing) a first model for the first cell 102A and a second model for the second cell 112A, remove the first cell 102A and the second cell 112A from the schematic design 124A, place the first model and the second model in the schematic design, and interconnect the first model and the second model with connectivity information from the schematic design and/or the layout.

Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 100A for execution.

These modules may include one or more EDA (electronic design automation) modules 136A such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design for finalizing the electronic design for mask preparation and mask writing as well as for tapeout for the eventual manufacturing of the electronic circuits represented by the electronic design.

These models may also include extracted view modules 120A that may include, for example, 3D and/or 2.5D modeling tools to model various components in the 3D or 2.5D space, extraction modules to extract geometric, physical, and/or electrical characteristics, properties, or attributes from various sources (e.g., layouts, SEM or scanning electron microscope photos, etc.), meshing module(s) to discretize an area or a volume into a plurality of meshes, and/or one or more geometry simplification or reduction modules to simplify geometries by approximating more complex geometries with simpler geometries (e.g., by approximating a curve with a plurality of straight segments depending upon the resource requirements and/or the accuracy requirements).

The extracted view modules 120A may also include one or more EM (electromagnetic) field solver modules, heuristic solver modules, and/to empirical formula solver modules to solve for the electrical behavior of an underlying electronic circuit. The extracted view modules 120A may further include a pre-layout exploration module that estimates the characteristics, attributes, and/or properties of a circuit component design, without invoking any layout editors.

These one or more computing systems 100A may further access a schematic design database 118A and a layout database 116A when generating an extracted view from a schematic design of an electronic design. A plurality of models (e.g., SPICE sub-circuits, IBIS models, s-parameter models, etc.) and/or parasitic data 122A may also be stored and made available to these one or more computing systems. For example, some embodiments may store parasitic data of some parameterized, pre-existing, or pre-characterized electronic circuit component designs in a tabular structure (e.g., a database) so that these one or more computing systems, when modeling an electronic circuit component design as model in an extracted view, may look up the parasitic data, model data, or even a parameterized model for a substantially similar or previously characterized electronic circuit component design so that these one or more computing systems 100A no longer need to expend as much or any computational resources in constructing the model for the electronic circuit component design.

Figure 1B:
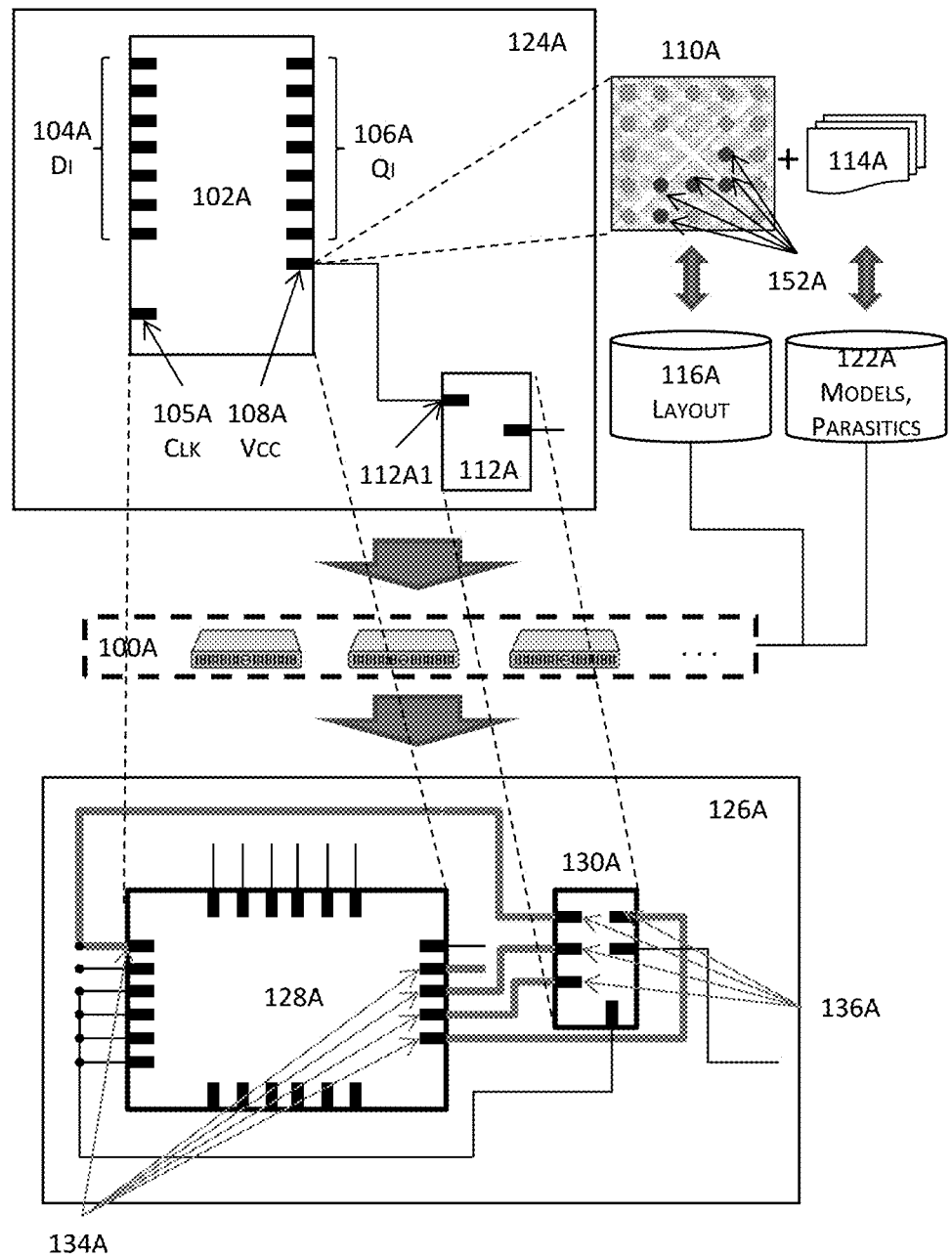
FIG. 1B illustrates more details about the high level block diagram of a simplified system for implementing schematic driven extracted views for an electronic design in some embodiments.

FIG. 1B illustrates more details about the high level block diagram of a simplified system for implementing schematic driven extracted views for an electronic design in some embodiments. In this example, the schematic design includes a single logical pin for the Vcc pin 108A for the first cell 102A and a single power pin for the second cell 112A. The one or more computing systems 100A may invoke, for example, one or more extracted view modules 120A to examine, for example, the layout connectivity information 110A or the optional electrical information 114A that shows the Vcc pin is actually distributed among a plurality of physical pins 152A. Similarly, the one or more computing systems may also determine that the single logical power pin 112A1 is also distributed among a plurality of actual, physical pins. An example of the optional electrical information may include:

```
! FormatFlat = 1
! GNDNET GND
! NETSLIST AVCC1
! Port 1 = U2-20 AVCC1
! Port 2 = U2-21 AVCC1
! Port 3 = U2-22 AVCC1
! Port 4 = U2-23 AVCC1
! Port 5 = D2-1 AVCC1
! ENCODED BEGIN
! 0889B71221DAF54192BECE698586F1178E3
! ENCODED_END
#              Hz    S    RI    R
```

These one or more computing systems 100A may create a first symbol for representing the first cell as a first model in an extracted view and a second symbol for representing the second cell as a second model in the extracted view. In some embodiments, a symbol may be created anew, whereas a symbol may be modified from an existing symbol (e.g., a schematic symbol of the first cell or the second cell). A symbol includes appropriate interfaces to connect the model to the remaining portion of the electronic design. In this example illustrated in FIG. 1B, the first symbol 128A is created for the first cell 102A and includes five Vcc pins 134A that respectively correspond to the five actual, physical pins 152A. The second symbol 130A is also created for the second cell 112A and includes four power pins 136A instead of a single logical pin 112A1 as in the original schematic design.

Although FIG. 1B does not show, a symbol or even an extracted view including the symbol may be further annotated with additional textual and/or graphical information comprising, for example, the identifiers of circuit component designs, physical, geometric, and/or electrical properties of circuit component designs, etc. The original schematic circuit component designs (102A and 112A) may be removed; and these symbols (128A and 130A) may be placed in the schematic design.

These symbols may further be interconnected with pertinent connectivity information using flight-line segments, orthogonal line segments, or a combination of one or more flight-line segments and orthogonal line segments. In some embodiments, these symbols may be interconnected with schematic connectivity information. In some other embodiments, these symbols may be interconnected with layout connectivity information. In other embodiments, one or more of these symbols may be interconnected with schematic connectivity information, and one or more remaining symbols may be interconnected with layout connectivity information. An extracted view 126A may then be stored at least temporarily in a volatile memory (e.g., random access memory) in some embodiments or persistently in a storage device (e.g., a disk drive). It shall be noted that an electronic design may concurrently correspond to more than one extracted views each of which is bound or associated with the single schematic design, the layout design, and the circuit component designs thereof.

Figure 2A:
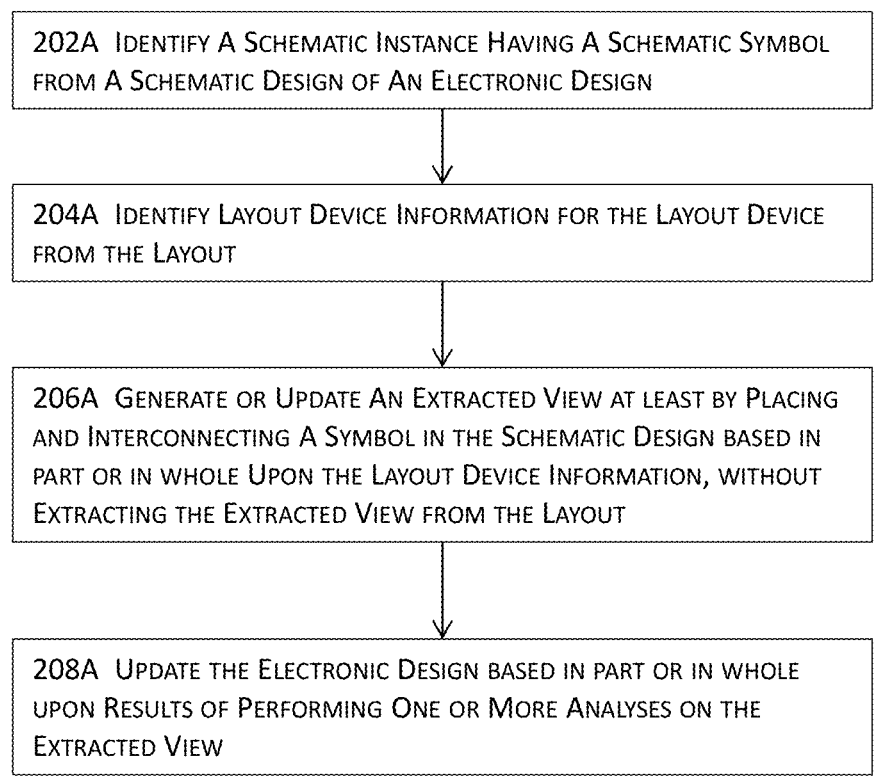
FIG. 2A illustrates a high level block diagram for implementing schematic driven extracted views for an electronic design in one or more embodiments.

FIG. 2A illustrates a high level block diagram for implementing schematic driven extracted views for an electronic design in one or more embodiments. A schematic instance or a schematic circuit component design (collectively a schematic instance for singular or schematic instances for plural)

may be first identified at 202A from a schematic design of an electronic design. In some of these embodiments, a layout device or a layout circuit component design corresponding to the schematic instance may also be identified.

A schematic instance may be identified at 202A interactively (e.g., a designer's selection of a schematic instance from the schematic design) in some embodiments; or a plurality of schematic instances may be automatically identified at 202A by one or more extracted view modules in some other embodiments. The schematic instance identified at 202A is a target for replacement with a corresponding model (e.g., a SPICE sub-circuit, an IBIS model, an s-parameter model, etc.) in an extracted view to be generated.

Some examples of schematic instances that may be identified at 202A include a critical net, a critical net segment, net segments having certain characteristics (e.g., net segments having at least a threshold width value and/or a specific material such as copper), RF (radio frequency) topologies (e.g., RF nets or net segments), microwave topologies (e.g., microwave nets or net segments), power grids, ground grids, RF IC wire bonds (e.g., conducting metal leads designed in pairs or a uniform height over a return plane), coplanar waveguides, ground planes inserted between metal layers for shielding electromagnetic waves, critical circuit component designs, an instance of multiple circuit components, or any grouping of schematic circuit component designs whose electrical behaviors may be of interest.

With the schematic instance identified at 202A, layout device information may also be identified at 204A for the corresponding layout circuit component design. This layout device information include, for example, electrical parasitics, geometric and/or electrical characteristics, attributes, or properties (e.g., resistivity, lengths, widths, etc.), layout connectivity information, pin mappings between logical pin(s) in a schematic design and physical pins in a corresponding layout, etc.

This layout device information may be identified by extraction with one or more extraction tools (e.g., one or more layout editors depending on the number of design fabrics) from the layout corresponding to the schematic design in some embodiments. In some other embodiments, this layout device information may be identified via estimation by a pre-layout exploration process. The former extraction techniques provide more accurate information at the expense of higher computational resource utilization, whereas the latter expends less computational resources yet provides less accurate information.

An extracted view may then be generated anew or updated from a pre-existing extracted view at 206A by placing a symbol representing the schematic instance identified at 202A in the schematic design. It shall be noted that the schematic design may be a snapshot or a copy of the original schematic in some embodiments so that the original schematic may be preserved. The symbol may further be interconnected with the remaining portion of the schematic design by using the schematic connectivity information, the layout connectivity information, or both.

The symbol may be the original schematic symbol of the schematic instance in some embodiments. In some other embodiments, the symbol placed into the schematic design at 206A may be a new symbol that may be generated from scratch in some embodiments or may be modified from an existing schematic symbol (e.g., the original schematic symbol of the schematic instance) in some other embodiments. Regardless of how the symbol is determined, the symbol includes appropriate interfaces (e.g., the number of interfaces and/or the locations of the interfaces) for proper interconnection between the symbol and the remaining portion of the schematic design. The schematic design including the symbol placed and interconnected at 206A may then be stored as an extracted view.

An extracted view thus includes sufficient information for an analysis module (e.g., a simulation engine) to compute, predict, validate, and/or test the electrical behaviors of the electronic design. For example, an extracted view may include one or more models and provide electrical properties (e.g., resistivity, etc.), geometric information (e.g., length, width, thickness, etc.), equivalent sub-circuits, bias information, temperature(s) or temperature range(s), stimuli, compensations (e.g., compensations in Vcc), pad and ESD (electrostatic discharge) structures, IC package property values, etc.

An extracted view may be generated in such a way that is understood by one or more analysis modules that may perform one or more analyses (e.g., electromagnetic simulations, various checks, etc.) on the extracted view to compute the electrical behaviors of the underlying electronic design. The electronic design may thus be updated at 208A based in part or in whole upon the results of the one or more analyses. These one or more analyses may include, for example, one or more electrical analyses that determine electrical behaviors of the electronic design of interest, layout-versus-schematic (LVS) check(s) with a layout and an extracted view of the electronic design of interest, schematic-versus-schematic check(s) with a schematic design and an extracted view of the electronic design of interest, or any combinations thereof. In some embodiments where a circuit component design is excluded from further analyses, an analysis may be performed to determine whether the exclusion of the circuit component design is appropriate. It shall be noted that these operations or tasks performed mentioned immediately above constitute examples, and that other operations or tasks may also be performed at 208A. More details about updating the electronic design at 208A are described below with reference to FIG. 2H.

Figure 2B:
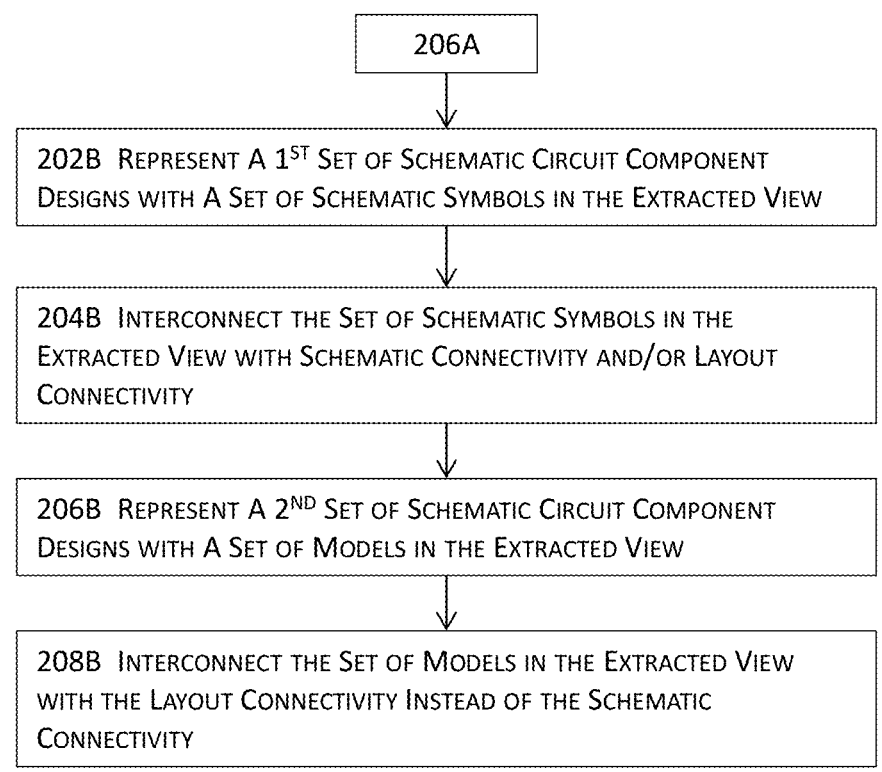
FIG. 2B illustrates more details about a portion of the high level block diagram illustrated in FIG. 2A in one or more embodiments.

FIG. 2B illustrates more details about a portion of the high level block diagram illustrated in FIG. 2A in one or more embodiments. More particularly, FIG. 2B illustrates more details about generating or updating an extracted view in some embodiments. In these illustrated embodiments, a first set of schematic circuit component designs may be represented at 202B with a set of schematic symbols in the extracted view. This set of schematic symbols may be further interconnected in the extracted view at 204B with the corresponding portion of the electronic design using the schematic connectivity information and/or layout connectivity information. In some embodiments, the first set of schematic circuit component designs includes the designs that can be represented with their original schematic symbols.

In addition to representing certain schematic circuit component designs with corresponding schematic symbols, a second set of schematic circuit component designs may further be represented with a set of models in the extracted view at 206B. In these embodiments, this second set of schematic circuit component designs include those whose schematic symbols do not provide sufficient details in modeling these schematic circuit component designs. Some examples of such schematic circuit component designs may include a device including distributed pins, vector pins, etc. where a logical pin in the original schematic symbol corresponds to more than one actual pin.

This set of models may then be inserted into the extracted view at 208B to replace the second set of schematic circuit component designs. In addition, this set of models may be further interconnected with the corresponding portions of the electronic design in the extracted view by using layout connectivity information, instead of the schematic connectivity information. This is because the schematic connectivity information provides information about how a logical pin is connected but provides no further details when the logical pin corresponds to more than one physical pins.

Figure 2C:
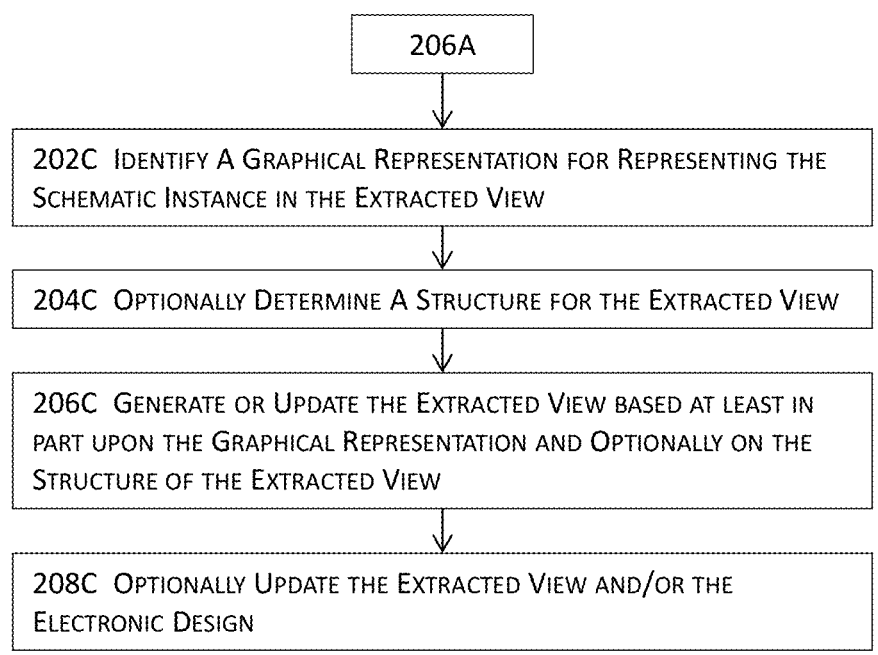
FIG. 2C illustrates more details about a portion of the high level block diagram illustrated in FIG. 2A in one or more embodiments.

FIG. 2C illustrates more details about a portion of the high level block diagram illustrated in FIG. 2A in one or more embodiments. More particularly, FIG. 2C illustrates more details about generating or updating an extracted view in some embodiments. In these illustrated embodiments, a graphical representation may be identified at 202C to represent the schematic instance identified at 202A. This graphical representation may be the original schematic symbol, a modified copy of the original schematic symbol, or a new symbol generated to represent the schematic instance in the extracted view. More details about the optional determination of the structure at 204C will be described below with reference to FIG. 2D.

A structure may be optionally determined for the extracted view at 204C. Unlike conventional extracted views that mostly constitute flat structures, an extracted view generated with the techniques described herein may include a hierarchical structure that matches that of the corresponding layout or corresponding schematic design. More details about the optional determination of the structure at 204C will be described below with reference to FIG. 2E.

The extracted view may then be generated anew or updated from an existing extracted view at 206C based in part or in whole upon the graphical representation of the schematic instance and optionally upon the structure of the extracted view. More details about the optional determination of the structure at 204C will be described below with reference to FIGS. 2F-2G.

Unlikely extracted views generated with conventional approaches, an extracted view generated with the techniques described herein at least graphically resembles the corresponding schematic design and is editable in a way that is identical to or substantially similar to editing a schematic design. As a result, the extracted view may be optionally updated (e.g., modified) at 208C. These techniques allow designers to directly modify an extracted view without pushing the changes to the layout and regenerating the extracted view by re-performing extraction on the layout, unless the designer modifies the layout topologies or makes extracted view changes that require corresponding layout changes.

Figure 2D:
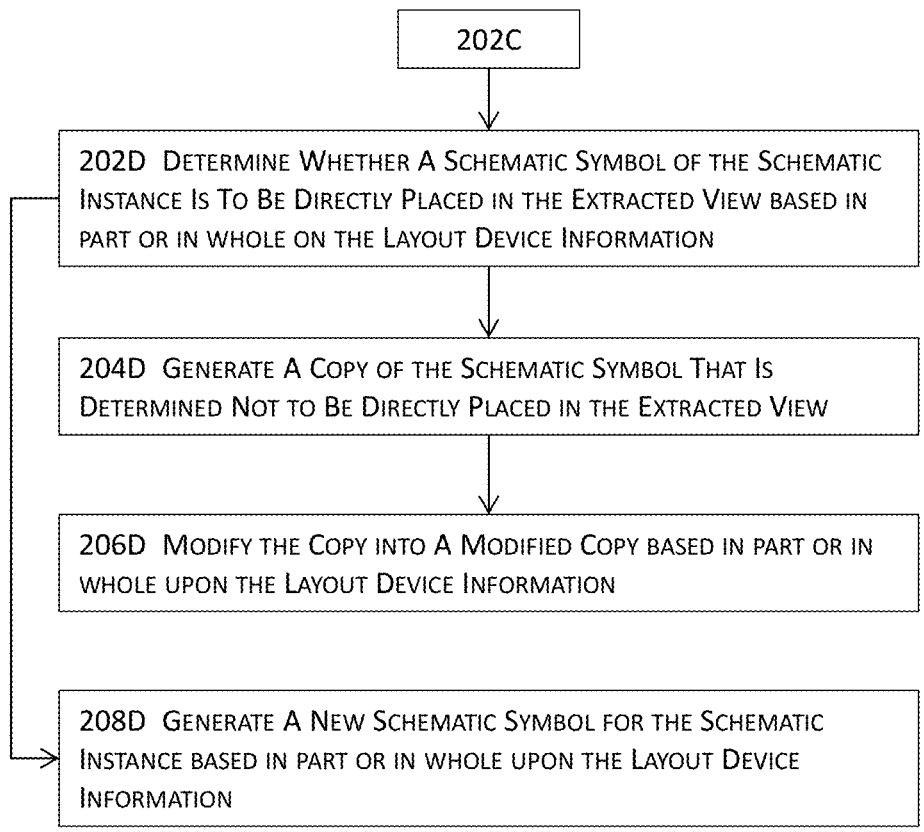
FIG. 2D illustrates more details about the block diagram illustrated in FIG. 2C in one or more embodiments.

FIG. 2D illustrates more details about the block diagram illustrated in FIG. 2C in one or more embodiments. More specifically, FIG. 2D illustrates the identification of a graphical representation at 202C in FIG. 2C. In these illustrated embodiments, a determination may be made at 202D to decide whether the schematic symbol of the identified schematic instance is to be directly placed in the extracted view. In some of these embodiments, this determination may be made based in part or in whole upon the layout device information identified at 204A. For example, the schematic symbol of a schematic instance having a logical pin that corresponding to multiple physical pins is unlikely to serve the purposes of an extracted view well because any abnormal probing results for the single logical pin in the symbol still cannot discern which physical pin may have caused such abnormal probing results.

When the determination result is negative, a copy of the schematic symbol may be generated at 204D in some embodiments; and this copy may be modified at 206D based in part or in whole upon the layout device information. For example, the original schematic symbol may be modified to include the appropriate number of interfaces based on the number of interfaces in the corresponding layout circuit component design (e.g., one with distributed pins or vector pins) for the schematic instance. The original schematic symbol may be further modified to include other information such as the identifiers of these interfaces.

On the other hand, if the determination result is affirmative, the schematic symbol may be directly placed or retained in the schematic design for the extracted view. Other than modifying an existing schematic symbol for the identified schematic instance, a new schematic symbol may be generated anew at 208D for the schematic instance identified at 202A.

Figure 2E:
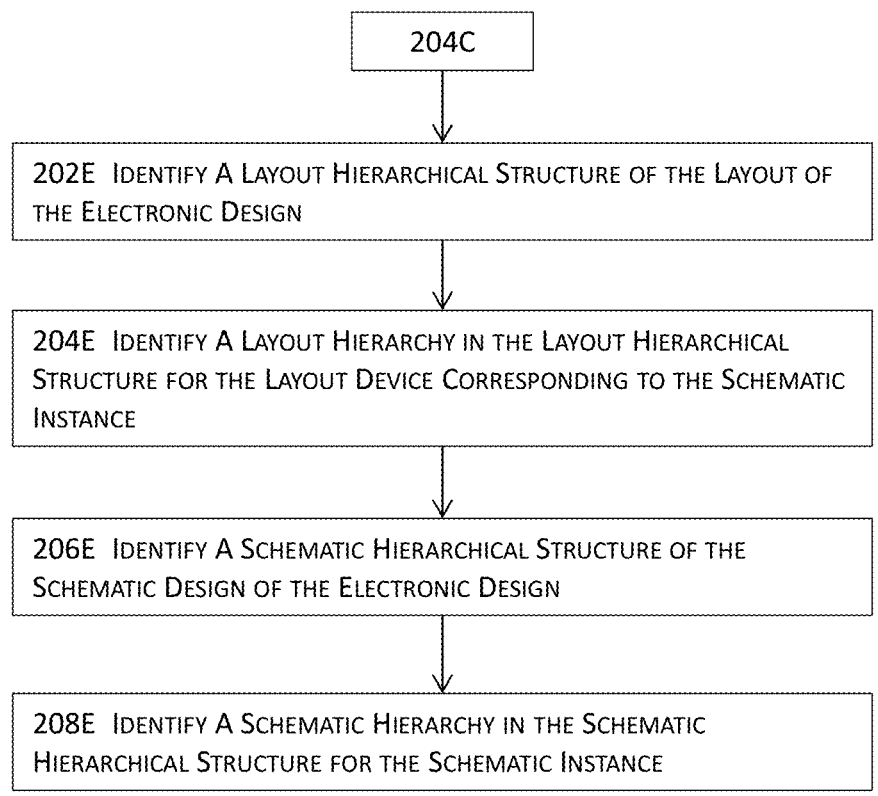
FIG. 2E illustrates more details about the block diagram illustrated in FIG. 2C in one or more embodiments.

FIG. 2E illustrates more details about the block diagram illustrated in FIG. 2C in one or more embodiments. More specifically, FIG. 2E illustrates more details about the optional determination of a structure for the extracted view. In these illustrated embodiments, a layout hierarchical of the layout may be identified at 202E. The layout hierarchy at which the layout device corresponding to the identified schematic instance (at 202A) is located may be identified at 204E. This layout hierarchical structure may be referenced in creating the extracted view so that the extracted view may preserve the layout hierarchical structure in these embodiments.

In addition to the layout hierarchical structure and layout hierarchy of the layout device or in the alternative, a schematic hierarchical structure may be identified at 206E for the schematic design. Similarly, the schematic hierarchy at which the identified schematic instance is located may be identified at 208E. This schematic hierarchical structure may be referenced in creating the extracted view so that the extracted view may preserve the schematic hierarchical structure in these embodiments.

In some embodiments, an extracted view may be constructed according to either the layout hierarchical structure or the schematic hierarchical structure although the schematic to layout mapping may further correlate the hierarchical structures of the extracted view, the layout, and the schematic design with one another.

Figure 2F:
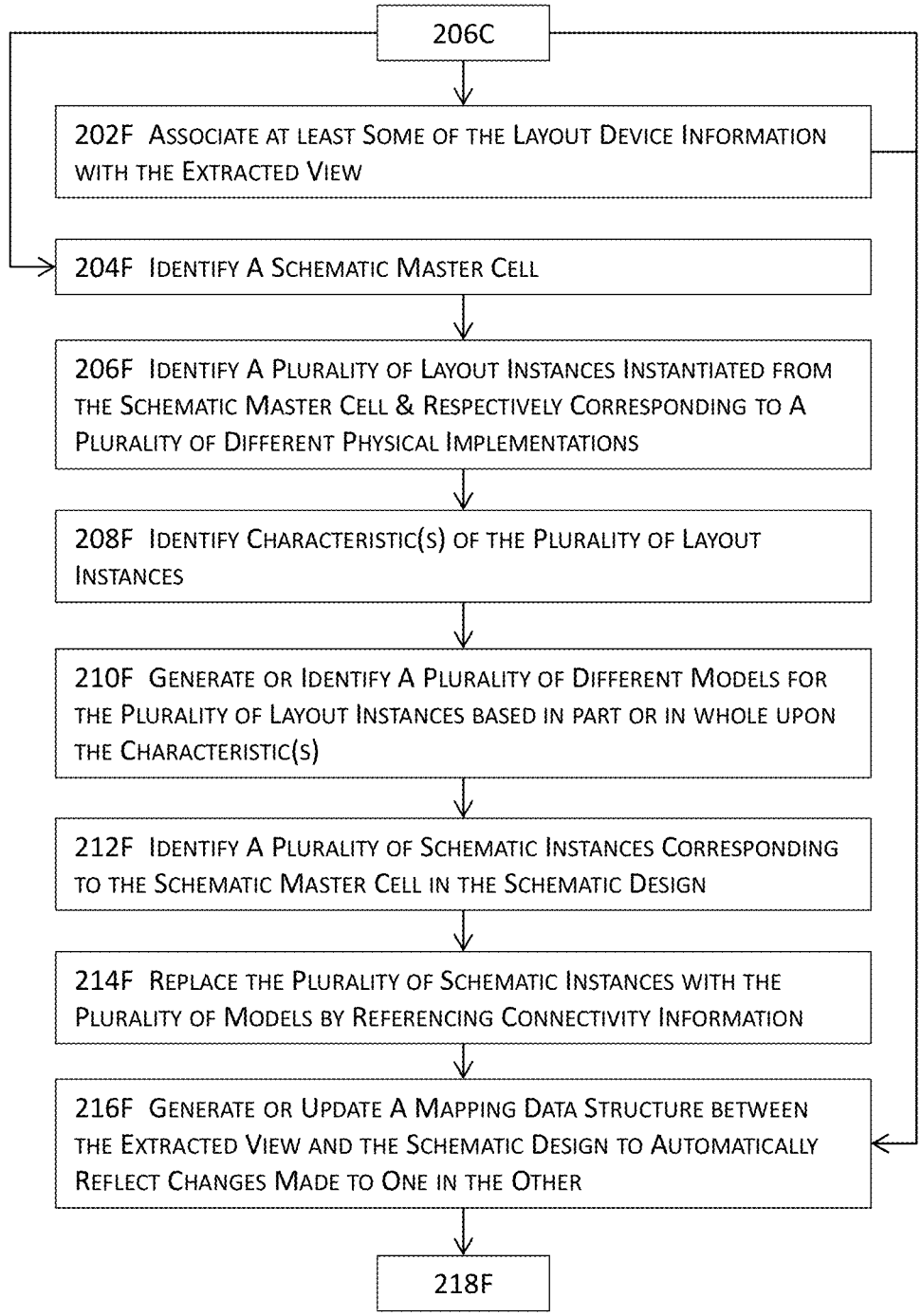
FIGS. 2F-2G jointly illustrate more details about the block diagram illustrated in FIG. 2C in one or more embodiments.
Figure 2G:
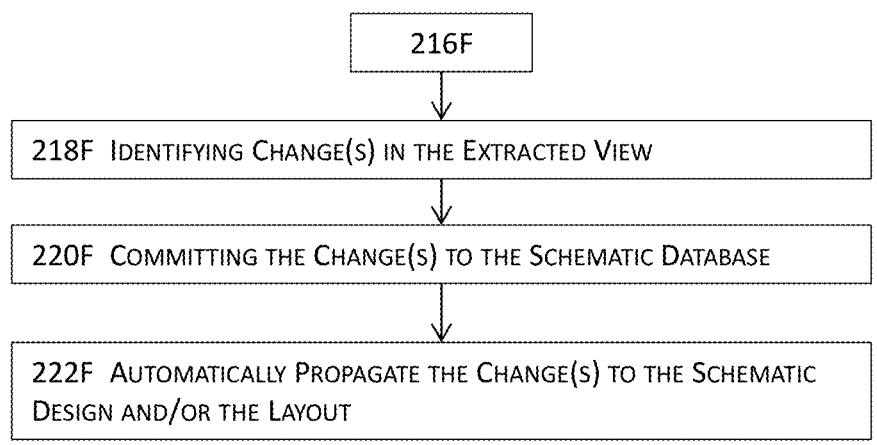

FIGS. 2F-2G jointly illustrate more details about the block diagram illustrated in FIG. 2C in one or more embodiments. More particularly, FIGS. 2F-2G illustrate more details about generating or updating an extracted view at 206C of FIG. 2C. In these illustrated embodiments, at least some of the layout device information may be associated with the extracted view or one or more models therein at 202F. This association may be achieved by binding the at least some of the layout device information with the extracted view or the one or more models therein.

In addition or in the alternative, a schematic master cell may be identified at 204F. In electronic designs, more than one schematic cell instance may be instantiated from a single schematic master cell. Nonetheless, the physical implementations for these schematic cell instances may not necessarily be identical in the layout. For example, the interconnections within these schematic cell instances may not necessarily be routed in the same way. These physical devices in the layout nevertheless correspond to the same schematic symbol in the schematic design.

A plurality of layout instances instantiated from the schematic cell instances may be identified at 206F. This plurality of layout instances may correspond to a plurality of different physical implementations. One or more characteristics that contribute to differing physical implementations may be identified at 208F. For example, geometric attributes of one or more interconnections having different physical implementations may be identified through, for example, extraction from the layout database, look-up from a look-up data structure, and/or estimates from a pre-layout exploration process, etc.

A plurality of different models may then be identified (if already existing) or generated (if non-existing) to correspond to the plurality of different physical implementations at 210F. In some embodiments, this plurality of different models may be identified or generated based at least in part upon the one or more characteristics leading or contributing to the plurality of different physical implementations.

A plurality of schematic cell instances corresponding to the same schematic master cell may be identified at 212F. These schematic cell instances may be optionally associated with or bound to the plurality of different models and/or the plurality of different physical implementations, and/or the plurality of layout instances with respective association links stored in a mapping data structure.

The plurality of schematic instances may be removed from the schematic design at 214F and replaced with the plurality of different models. The plurality of different models may be interconnected with the corresponding portions of the remaining schematic design by referencing the layout connectivity information but not the connectivity information. Depending on how the plurality of different physical implementations differ from each other, the plurality of different models may be interconnected by using only the schematic connectivity information, the layout connectivity information, or both.

For example, in some cases where the schematic cell instances include distributed pins or vector pins so that one logical pin in a schematic cell instance corresponds to multiple physical pins in the correspond layout instance, the plurality of different models may be interconnected by referencing the layout connectivity information. In some other cases where the plurality of different physical implementations differ from each other only in the physical implementations of interconnections within each of these instances, either the schematic connectivity information or the layout connectivity information may be referenced in interconnecting the plurality of different models.

A mapping data structure may be generated or updated at 216F to store the association between the extracted view and the schematic design. The mapping data structure may store, for example, the association between a model and the corresponding schematic instance, between a model and the corresponding layout instance, etc. so that a change made to one is automatically reflected in the others. In some of these embodiments, such automatic reflection of changes can be even achieved without invoking any layout tools unless the changes also cause layout topology changes.

One or more changes to the extracted view may be identified at 218F. As described above, an extracted view may be generated and first stored in volatile memory such as the random access memory. These one or more changes are thus residing in the volatile memory at the beginning. This temporary storage of changes made to an extracted view may be helpful in, for example, preliminary analyses such as concept and feasibility analyses, what-if analyses, etc. A change may nevertheless mature into a desirable or intended change for the electronic design. This change may thus be committed to, for example, the schematic design database at 220F. Once this change is committed and thus persistently stored, the corresponding changes may be automatically populated to the layout and/or the schematic design at 222F.

Figure 2H:
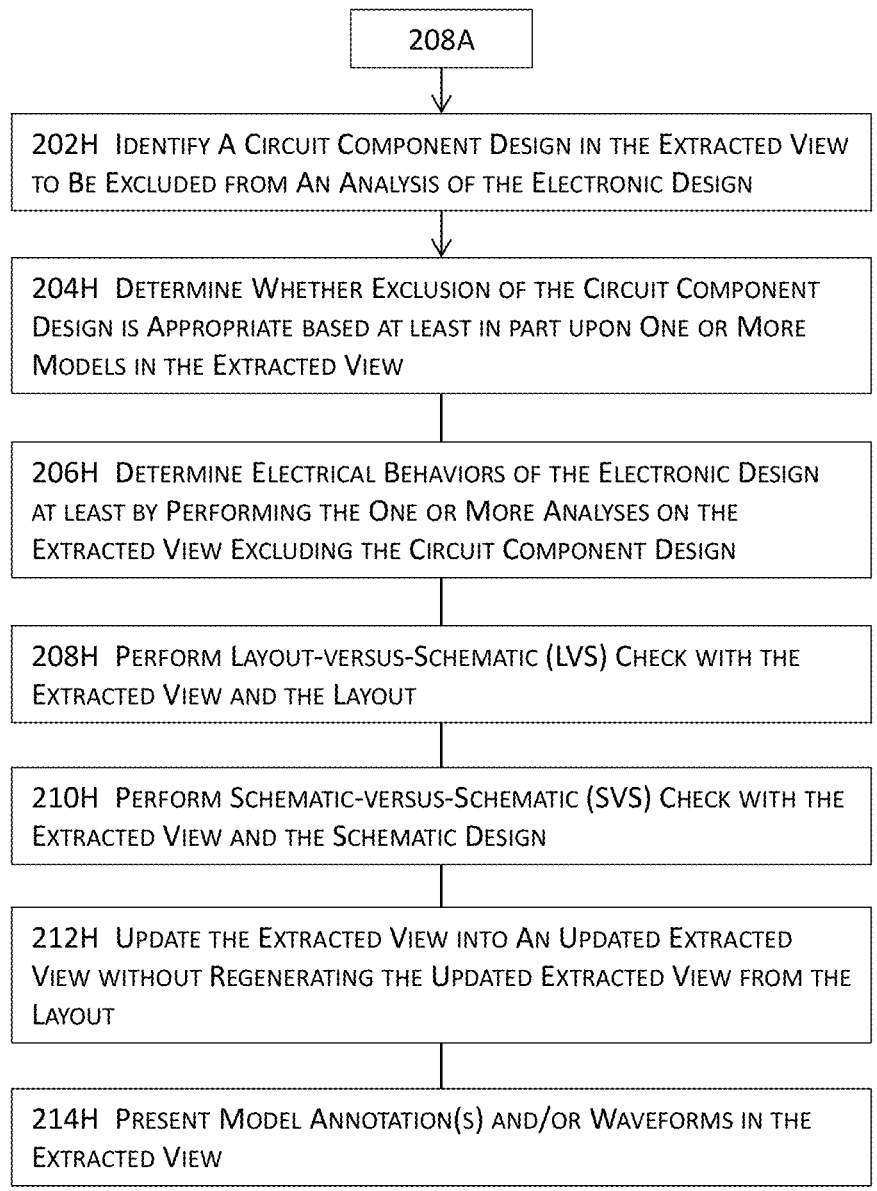
FIG. 2H illustrates more details about the block diagram illustrated in FIG. 2A in one or more embodiments.

FIG. 2H illustrates more details about the block diagram illustrated in FIG. 2A in one or more embodiments. More specifically, FIG. 2H illustrates more details about generating or updating the electronic design at 208A of FIG. 2A. It shall be noted that some of these acts described herein for FIG. 2H may be performed in any order or sequence so that these acts are connected in FIG. 2H with line segments, rather than arrowheads. In these illustrated embodiments, a circuit component design to be excluded from an upcoming analysis may be identified in the extracted view at 202H. This circuit component design may include a schematic circuit component design in some embodiments or a model representing one or more schematic circuit component designs in some other embodiments.

A determination may be made at 204H to decide whether exclusion of the identified circuit component design is appropriate based in part or in whole upon one or more models in the extracted view. For example, a circuit component design that is included in a model may not be an appropriate target for exclusion because the model is incomplete for an analysis module to arrive at a solution.

Electrical behaviors of the electronic design may be determined at 206H at least by performing one or more analyses on the extracted view that excluded the identified circuit component design. In addition, a layout-versus-schematic (LVS) check may be performed at 208H with the extracted view and the corresponding layout in some embodiments. Similarly, a schematic-versus-schematic (SVS) check may be performed at 210H with the extracted view and the corresponding schematic design in some embodiments. In other words, an extracted view of an electronic design may be generated not only to graphically resemble a schematic design of the electronic design but also to functionally resemble the schematic in these embodiments.

In some embodiments, the extracted view may be modified at 212H into an updated extracted view, without regenerating the updated extracted view from the layout. In these embodiments, the extracted view may be directly edited in an identical or substantially similar manner as editing a schematic design to incorporate one or more changes into the updated extracted view. In some embodiments, one or more changes may be made in the schematic design, rather than in the extracted view. In these embodiments, the extracted view may be automatically updated into the updated extracted view, without pushing the one or more changes to the layout and the regenerating the updated extracted view from the modified layout.

It shall be noted that these one or more changes made to the schematic design or the extracted view do not cause corresponding changes in the layout topology in these embodiments. In some embodiments where these one or more changes in the schematic design or the extracted view cause corresponding changes in the layout topology, the corresponding changes may also be automatically populated into the layout. In these latter embodiments, one or more layout editors may be invoked to populate the corresponding changes, depending on how many design fabrics are affected by the corresponding changes in the layout topology.

An extracted view may be forward or backward annotated with various types of data or information. These annotations may be configured and presented in the extracted view at 214H based on the configuration. In addition or in the alternative, a user may probe various points or devices in an extracted view. In response to a probing action, the corresponding electrical behaviors may be retrieved from one or more analyses if these one or more analyses have been completed. In some other embodiments where no analyses have been performed, one or more analysis modules may be automatically invoked to perform one or more pertinent analyses to provide the probing results. These probing results such as nodal values and/or waveforms may also be presented at 214H in the extracted view or in a separate window correlated to the extracted view.

Figure 3A:
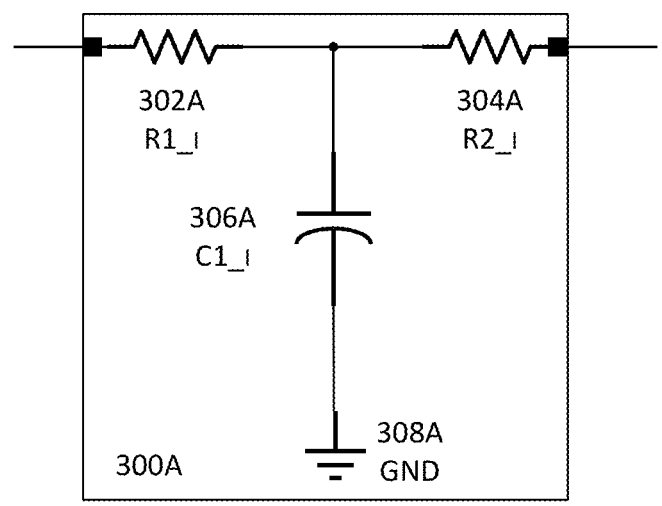
FIG. 3A illustrates an example of a simplified schematic cell in one or more embodiments.

FIG. 3A illustrates an example of a simplified schematic cell in one or more embodiments. More specifically, FIG. 3A illustrates a schematic master cell 300A of a simplified filter. As illustrated in FIG. 3A, the simplified filter includes two resistors 302A (R1_i) and 304A (R2_i) connected to a first capacitor 306A (C1_i) that is grounded at 308A, where "i" denotes the i-th instance of schematic master cell 300A.

Figure 3B:
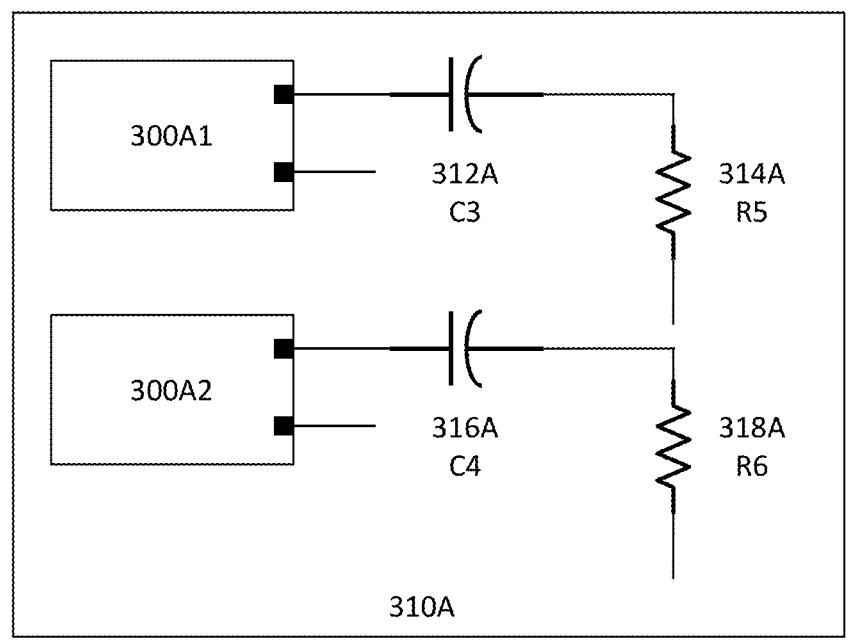
FIG. 3B illustrates an example of a portion of a simplified schematic design including two instances of the simplified schematic cell illustrated in FIG. 3A in one or more embodiments.

FIG. 3B illustrates an example of a portion of a simplified schematic design including two instances of the simplified schematic cell illustrated in FIG. 3A in one or more embodiments. This simplified schematic design portion 310A includes two schematic instances 300A1 and 300A2 of the schematic master cell 300A. The first schematic instance 300A1 is connected to a third filter 312A (C3) that is further connected to a fifth resistor 314A (R5). Similarly, the second schematic instance 300A2 is connected to a fourth filter 316A (C4) that is further connected to a sixth resistor 316A (R6). Other than showing the optionally identifiers for the first and second schematic instances 300A1 and 300A2, the schematic design 310A does not otherwise distinguish these two schematic instances although the physical implementations of these two schematic instance in the layout may or may not necessarily be identical.

Figure 3C:
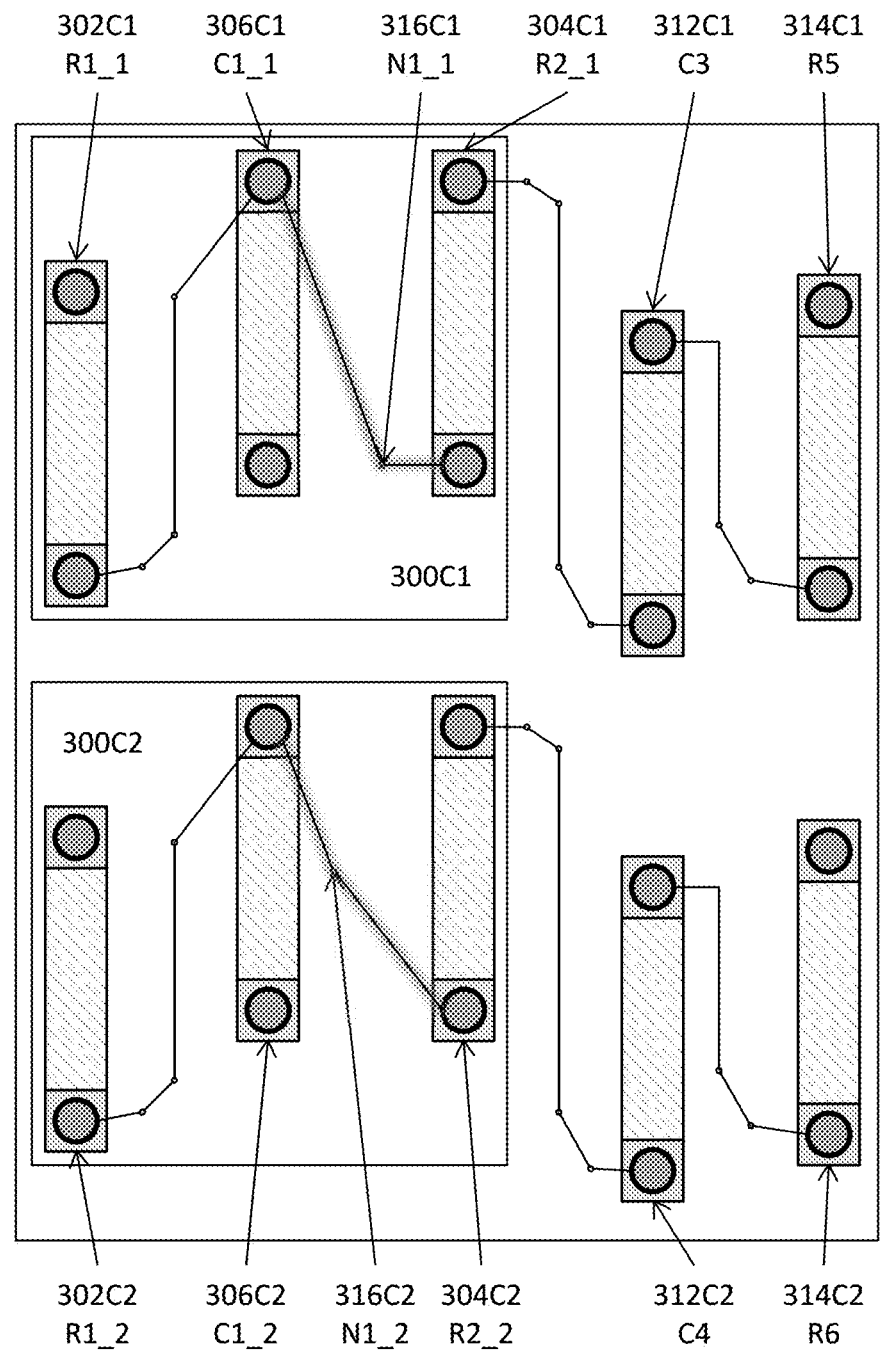
FIG. 3C illustrates an example of a simplified layout portion corresponding to the portion of the simplified schematic design illustrated in FIG. 3B in one or more embodiments.

FIG. 3C illustrates an example of a simplified layout portion corresponding to the portion of the simplified schematic design illustrated in FIG. 3B in one or more embodiments. As FIG. 3C shows, the physical implementation 300C1 in the layout for the first schematic instance 300A1 is different from the physical implementation 300C2 in the layout for the second schematic instance 300A2.

The first physical implementation 300C1 includes the first resistor 302C1 connected to a first capacitor 306C1 that is further connected to a second resistor 304C1 via a first wire 316C1. The second resistor 304C1 of the first layout instance 300C1 is further connected to a third capacitor 312C1 that is in turn connected to the fifth resistor 314C1.

The second physical implementation 300C2 includes the third resistor 302C2 connected to a second capacitor 306C2 that is further connected to a fourth resistor 304C2 (R2_2) via a second wire 316C2. The fourth resistor 304C2 of the second layout instance 300C2 is further connected to a fourth capacitor 312C2 that is in turn connected to the sixth resistor 314C2. As illustrated in FIG. 3C, the first wire 316C1 in the first layout instance 300C1 is routed differently from the second wire 316C2 in the second layout instance 300C2. This difference in the physical implementations of the two schematic instances 300A1 and 300A2 instantiated from the same schematic master cell 300A is not shown in the schematic design 310A.

Figure 3D:
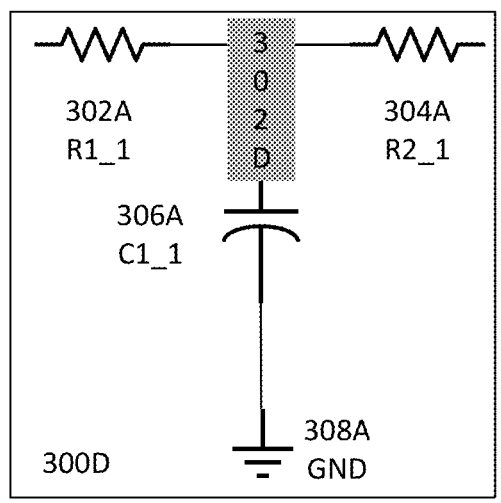
FIG. 3D illustrates an example of a schematic driven model that may be used for analyzing electrical behaviors of the simplified schematic cell illustrated in FIG. 3A in one or more embodiments.

FIG. 3D illustrates an example of a schematic driven model that may be used for analyzing electrical behaviors of the simplified schematic cell illustrated in FIG. 3A in one or more embodiments. In these embodiments, an extracted view module may extract the wire (e.g., 316C1) indicating the different physical implementation from one layout instance (e.g., 300C1 in FIG. 3C) and determine a model 302D for the schematic instance (e.g., 300A1) with a, for example, s-parameter model (or any other suitable model). The extracted view module may similarly extract the other wire (e.g., 316C2) from the other layout instance (e.g., 300C2 in FIG. 3C) and determine a different model for the other schematic instance (e.g., 300A2) with a different s-parameter model (or any other suitable model). A model 300D may thus be generated for the first schematic instance (e.g., 300A1). Similarly, a different model may be generated for the second schematic instance.

These two models may then be placed in the schematic design to generate an extracted view; and these two placed models may then be interconnected by using connectivity information as described above. In some embodiments, one or both models may be generated without extraction. In these embodiments, these models may be constructed with estimated values from pre-layout explorations. With these two models replacing the original schematic instances (300A1 and 300A2), a user may thus distinguish or know that the two instances instantiated from the same schematic master cell 300A correspond to different physical implementations with the extracted view due to the presence of these two different models.

Figure 4A:
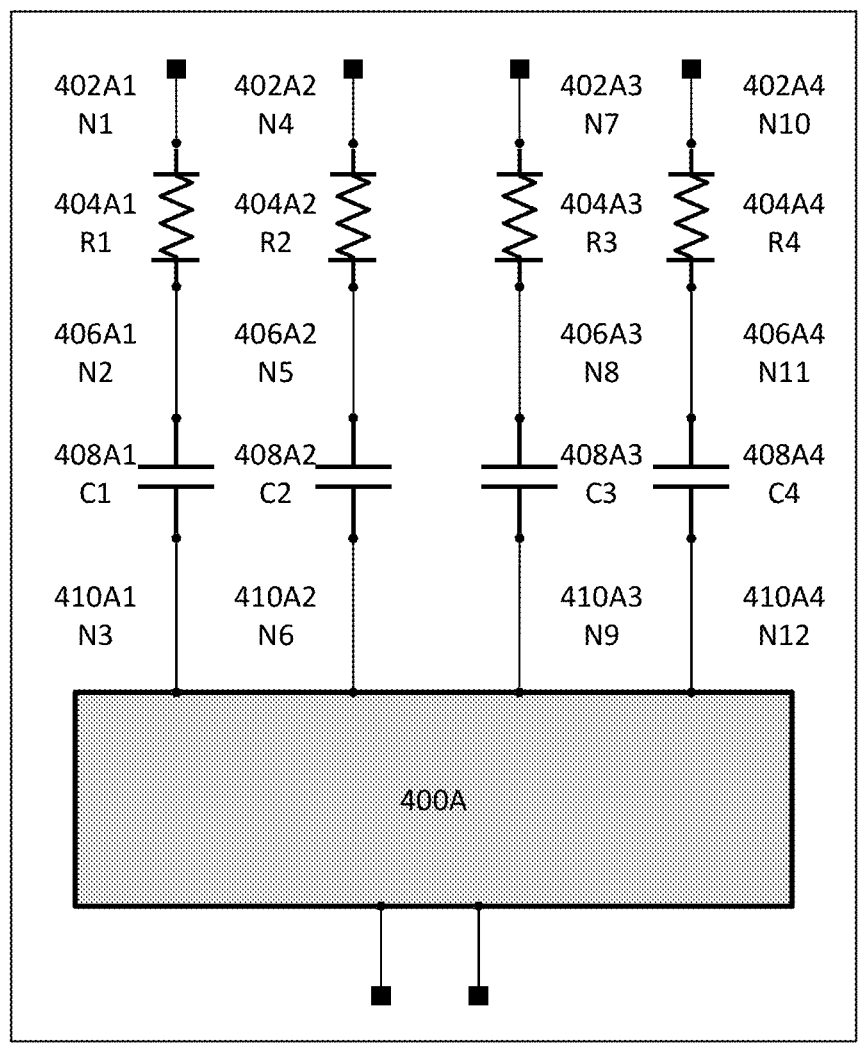
FIG. 4A illustrates an example of a portion of a simplified schematic design in one or more embodiments.

FIG. 4A illustrates an example of a portion of a simplified schematic design in one or more embodiments. In this example, the schematic design includes a schematic cell 400A that is operatively connected to four sets of schematic circuit component designs. Each set of schematic circuit component design includes a first net (e.g., 402A1 or the first net N1, 402A2 or the fourth net N4, 402A3 or the seventh net N7, and 402A4 or the tenth net N10) connected to a first resistor (e.g., 404A1 or the first resistor R1, 404A2 or the second resistor R2, 404A3 or the third resistor R3, and 404A4 or the fourth resistor R4) in series.

The first resistor in each set is further connected to a second net (e.g., 406A1 or the second net N2, 406A2 or the fifth net N5, 406A3 or the eighth net N8, and 406A4 or the eleventh net N11) which is in turned connected to a first capacitor (e.g., 408A1 or the first capacitor C1, 408A2 or the second capacitor C2, 408A3 or the third capacitor C3, and 408A4 or the fourth capacitor C4). The first capacitor in each set of schematic circuit component designs is then connected to the schematic cell 400A.

Figure 4B:
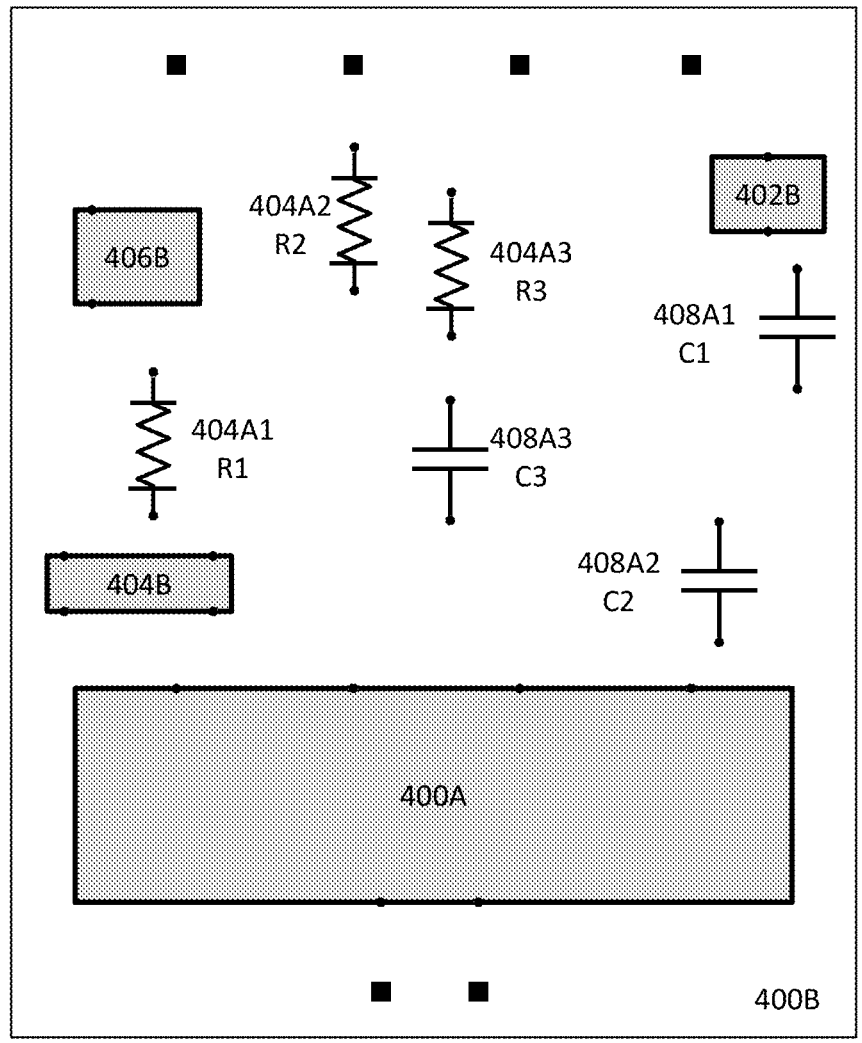
FIG. 4B illustrates an example of a conventional layout driven extracted view.

FIG. 4B illustrates an example of a conventional, layout-driven extracted view 400B that randomly or pseudo-randomly leaves various circuit component designs in the conventional extracted view 400B. For example, conventional approaches may extract the models 402B, 404B, and 406B from the layout and randomly or pseudo-randomly insert these three models in the layout-driven extracted view 400B.

The other circuit component designs that are not represented as specific models are also randomly or pseudo-randomly added to this layout-driven extracted view. For example, conventional approaches may randomly or pseudo-randomly insert the first resistor R1 (404A1), the second resistor R2 (404A2), the third resistor R3 (404A3), the first capacitor C1 (408A1), the second capacitor C2 (408A2), and the third capacitor C3 (408A3) in the layout-driven extracted view.

Moreover, the interconnections between these circuit component designs and models may be textually described. As a result, this conventional, layout-driven extracted view loses the graphical resemblance with the original design (e.g., the schematic design or the layout) and does not convey much information other than what circuit component designs are included in this conventional, layout-driven extracted view.

In addition, this type of conventional, layout-driven extracted views are often static or non-editable in the sense that even if a user attempts to edit this conventional, layout-driven extracted view, the user may not even know where to start with the intended modifications without deeply scrutinizing what is included but not shown to the users (e.g., how these circuit component designs randomly spread across the extracted view are interconnected) because this conventional, layout-driven extracted view simply does not convey much information about the underlying electronic design or the extracted view itself.

Figure 4C:
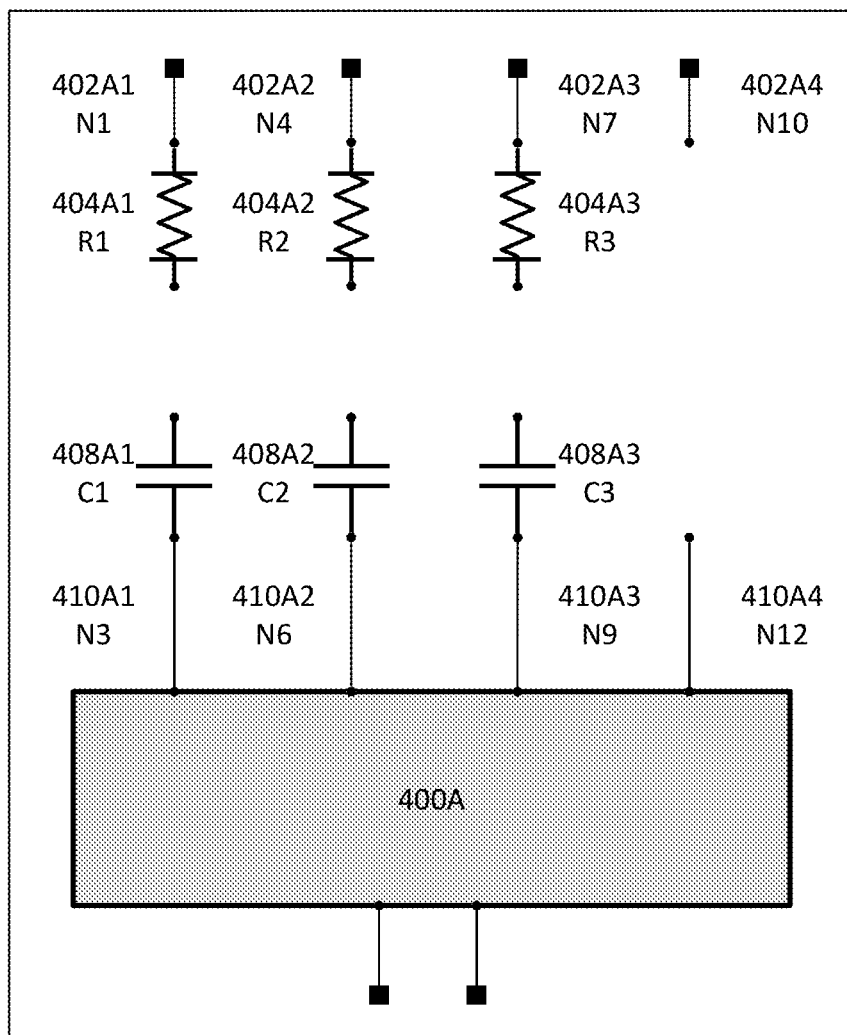
FIG. 4C illustrates an intermediate stage of a process for generating a schematic driven extracted view for the simplified schematic design in one or more embodiments.

FIG. 4C illustrates an intermediate stage of a process for generating a schematic driven extracted view for the simplified schematic design in one or more embodiments. More specifically, FIG. 4C illustrates an intermediate stage at which the schematic circuit component designs 406A1 (the second net N2), 406A2 (the fifth net N5), 408A3 (the eighth net N8), 404A4 (the fourth resistor R4), 406A4 (the eleventh net), and 408A4 (the fourth capacitor C4) are removed from the schematic design.

The schematic design symbols of the other schematic component designs are retained in the schematic design. The retention of a schematic design symbol in a schematic design may indicate that the schematic circuit component design is also retained in some embodiments, or that a model actually replaces the schematic circuit component design yet uses the same schematic symbol in some other embodiments. These removed schematic circuit component designs will be represented with models in the extracted view as described above.

Figure 4D:
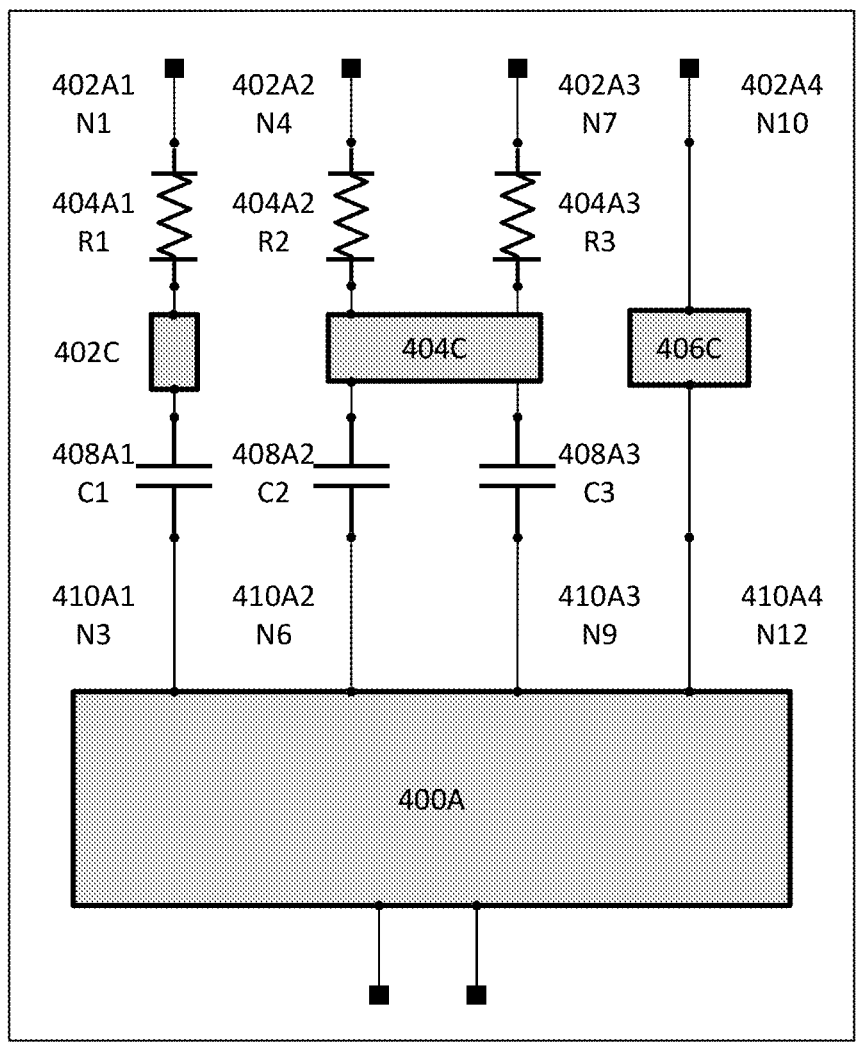
FIG. 4D illustrates an example of a schematic driven extracted view for the simplified schematic design in one or more embodiments.

FIG. 4D illustrates an example of a schematic driven extracted view for the simplified schematic design in one or more embodiments. In this example, three models 402C, 404C, and 406C are inserted and placed in the schematic design. For example, model 402C is inserted into the schematic design to replace net segment 406A1 (the second net N2); model 404C is inserted into the schematic design to replace net segment 406A2 (the fifth net N5) and net segment 406A3 (the eighth net N8); and model 406C is inserted into the schematic design to replace resistor 404A4 (the fourth resistor R4), the net segment 406A4 (the eleventh net N11), and capacitor 408A4 (the fourth capacitor C4).

In addition, each of these three models is properly interconnected with the corresponding portion of the schematic design by using connectivity information (e.g., schematic connectivity information and/or layout connectivity information) in an identical or substantially similar manner as described above with reference to FIGS. 2A-2H.

Various embodiments provide a more flexible, more efficient, and more accurate platform for implementing electronic designs. Some embodiments generates an extracted view based on a master schematic and the layout generated from the master schematic. A master schematic is the schematic design in the schematic domain and is used to generate the corresponding layout in the physical domain for an electronic design.

More specifically, an extracted view may be generated by identifying the corresponding schematic symbols for the respective layout circuit component designs. These schematic symbols are not blindly or randomly placed into the extracted view as in some conventional approaches. Rather, in placing a schematic symbol into an extracted view, the parasitics, electrical, and/or connectivity information, etc. for the corresponding layout component design may also be obtained from the layout. This information obtained from the layout may be used to determine whether the schematic symbol may be directly placed into the extracted view or a modified or regenerated schematic symbol is needed in its place.

In an example where an instance having distributed/vector pins, some embodiments generate an extracted view by retrieving information (e.g., parasitics, electrical, and/or connectivity) from both the master schematic design and the layout. The layout information (e.g., connectivity) shows that the schematic symbol (e.g., a symbol having a single pin corresponding to the distributed or vector pins) cannot faithfully represent the layout component design.

These techniques may then create a copy of the schematic symbol and modify the copy of the schematic symbol to accommodate the distributed or vector pins and insert this modified copy of the schematic symbol into the extracted view in some embodiments. In some other embodiments, these techniques may generate a new schematic symbol that includes multiple pins to represent the distributed or vector pins with the corresponding connectivity information for these multiple pins so that these multiple pins in the schematic symbol respectively correspond to the pins in the layout instance. This modified or new schematic symbol may also be correlated with the original schematic master symbol with, for example, a link structure.

In some of these embodiments, these techniques may identify one or more instances that are connected to the power net and/or ground net in the master original schematic. One or more corresponding new symbols may be generated for these one or more instances at least by retrieving layout device information that ensures that a newly generated schematic symbol has the same number of pins (e.g., power and/or ground pins) as the corresponding layout circuit component.

In some embodiments where a copy of the original, master schematic is to be modified into the extracted view, the corresponding schematic instances pertaining to these one or more identified instances may be removed from the copy of the original, master schematic. In these embodiments, the corresponding new schematic symbol instances may be inserted in place of these one or more removed instances.

In some other embodiments where the extracted view is generated anew, the one or more new schematic symbol instances may be inserted into the newly generated extracted view and connected via flight line segments or orthogonal line segments according to the connectivity information obtained from the layout. These new schematic symbol instances may be similarly connected using the connectivity information from the layout and/or the schematic.

In both embodiments, the insertion of these new schematic symbol instances having multiple pins corresponding to those of the corresponding layout circuit component may be inserted into the extracted view according to the hierarchical structure of the layout and/or the schematic to create a hierarchical extracted view. In some embodiments where a net constitutes an interface into a hierarchical block, this net or the model thereof may be inserted to the highest hierarchical level. In these embodiments, the hierarchical nature of the electronic design (e.g., in the schematic and/or the layout) is maintained.

The extracted view is editable so that a designer can modify the contents directly in the extracted view, without having to make changes to the master schematic design, push the changes to the layout to create an updated layout with a layout editor, and re-generate an updated extracted view from the updated layout as conventional approaches require.

Extracted views generated with the techniques described herein may also include or be associated with parasitic information, electrical characteristics, and/or layout connectivity information. Therefore, an extracted view may be used to perform schematic-versus-schematic (SVS) and layout-versus-schematic (LVS) verifications to ensure that an extracted view thus generated is functionally and/or logically equivalent to the original master schematic and the layout.

Some conventional approaches that use certain models that enable the analysis capability of signal integrity (e.g., simultaneous switching noise, signal coupling, target voltage levels, etc.) and arrange these models in an arrangement that often does not resemble schematic designs with which designers are familiar (e.g., an extracted view including visually disconnected s-parameter models).

Some embodiments generate extracted views with schematic symbols, specific models (e.g., s-parameter models, IBIS models, SPICE models, etc.), or a combination of schematic symbols for some circuit component designs and models for the other circuit component designs in a way with which designers are familiar with. These extracted views are generated to provide visual information to allow designers to visually comprehend how instances in an extracted view are connected. That is, the visual characteristics as well as the hierarchical structure of an extracted view can be exactly identical to or substantially similar to the original, master schematic with the exception of specific models (e.g., s-parameter models, IBIS models, SPICE models, etc.) that are used to represent certain circuit component designs in extracted views. Some embodiments further optionally show various parameters, electrical and/or parasitic information, etc. in an extracted view.

In addition or in the alternative, extracted views can be generated as static, non-editable views as conventional extracted views in some embodiments or as fully editable views where designers are permitted to manipulate an editable extracted view in exactly the same manner as designers manipulate schematic designs or electronic designs including specific models (e.g., s-parameter models, IBIS models, SPICE models, etc.)

The editability of extracted views not only conserve expensive computational resources by eliminating the expensive function call to push changes from the schematic to the layout and to re-generate an extract view from an updated layout but also enable flexible analyses or experiments such as a what-if analysis by shorting two pins without passing through a device). In some embodiments, unless a change requires the native functionality of a layout editor, changes are made directly in an extracted view generated with the techniques described herein without the invocation or execution of the layout editor.

Also, the extracted view can be linked to the original master schematic with a mapping structure between the two so that any changes in the master schematic are automatically reflected in the extracted view without pushing the changes to the layout editor and then extract the updated extracted view therefrom. Therefore, all values of circuit component designs, test-bench interfaces, hierarchical schematics, etc. may flow directly from the original, master schematic to extracted views.

To address multiple layout instances corresponding to the same schematic symbol yet having different physical implementations, some embodiments may extract the characteristics of the different physical implementations among these multiple layout instances, generate or identify (if pre-existing) models (e.g., s-parameter models) for these multiple layout instances, and insert these models into an extracted view, instead of or rather than using the original schematic symbol that cannot distinguish the differences in their physical implementations. In some embodiments, a first model may be generated or identified for a first layout instance of the multiple layout instances, and the remaining layout instances may be represented with simplified models that contain only information about the variance between a particular layout instance and the first layout instance.

In some embodiments, an extracted view may be generated by identifying one or more interfaces for one or more stimuli and one or more observation points. In these embodiments, a test-bench may be created from an original, master schematic for simulations. A hierarchical editor may be invoked via, for example, a function call to bind one or more circuit component designs to respective models (e.g., s-parameter models, IBIS models, SPICE models, etc.) One or more circuit component designs may be optionally ignored so that these one or more circuit component designs are not simulated in upcoming simulation(s) in some embodiments.

In some of these embodiments, any net connected to an ignored circuit component design may be treated as a floating net by the simulation engine. Technically, any circuit component design may be selected to be ignored and thus excluded from upcoming simulation(s). Nonetheless, these techniques also include some built-in intelligence to flag any incorrectly identification of circuit component designs that are to be ignored. For example, if a circuit component design is included in a set of circuit component designs that is to be represented by a model (e.g., an s-parameter model), the identification of this circuit component design to be ignored will be flagged as an error. Similarly, if a test-bench interface is embedded in an model in an extracted view, the identification of this interface to be ignored will be flagged as an error.

An extracted view (or a schematic extracted view) may be generated by inserting standard schematic symbols for some circuit component designs and by inserting models for some other circuit component designs. These schematic symbols and models may be connected by using the layout connectivity information. In some embodiments, standard schematic symbols in an extracted view may be interconnected by using the schematic connectivity information. Of course, these standard schematic symbols in the extracted view may also be interconnected by using the layout connectivity information although certain newly generated schematic symbol instances or models (e.g., those generated to represent circuit component designs having distributed or vector pins) may be correctly interconnected with the layout connectivity information.

With the extracted view generated, a hierarchical editor may be further invoked or executed to bind the test-bench symbols to the original, master schematic and/or one or more extracted views generated with the techniques described herein. With the binding, an extracted view may be automatically updated with changes in the original, master schematic without human intervention. In some of these embodiments, changes in an extracted view may also be automatically propagated to the original, master schematic when these changes in the extracted view are committed to the database. In some other embodiments, changes in an extracted view, regardless of whether these changes have been committed, may be stored in a separate data structure (e.g., a copy of the original schematic database) in order to preserve the original, master schematic.

System Architecture Overview

Figure 5:
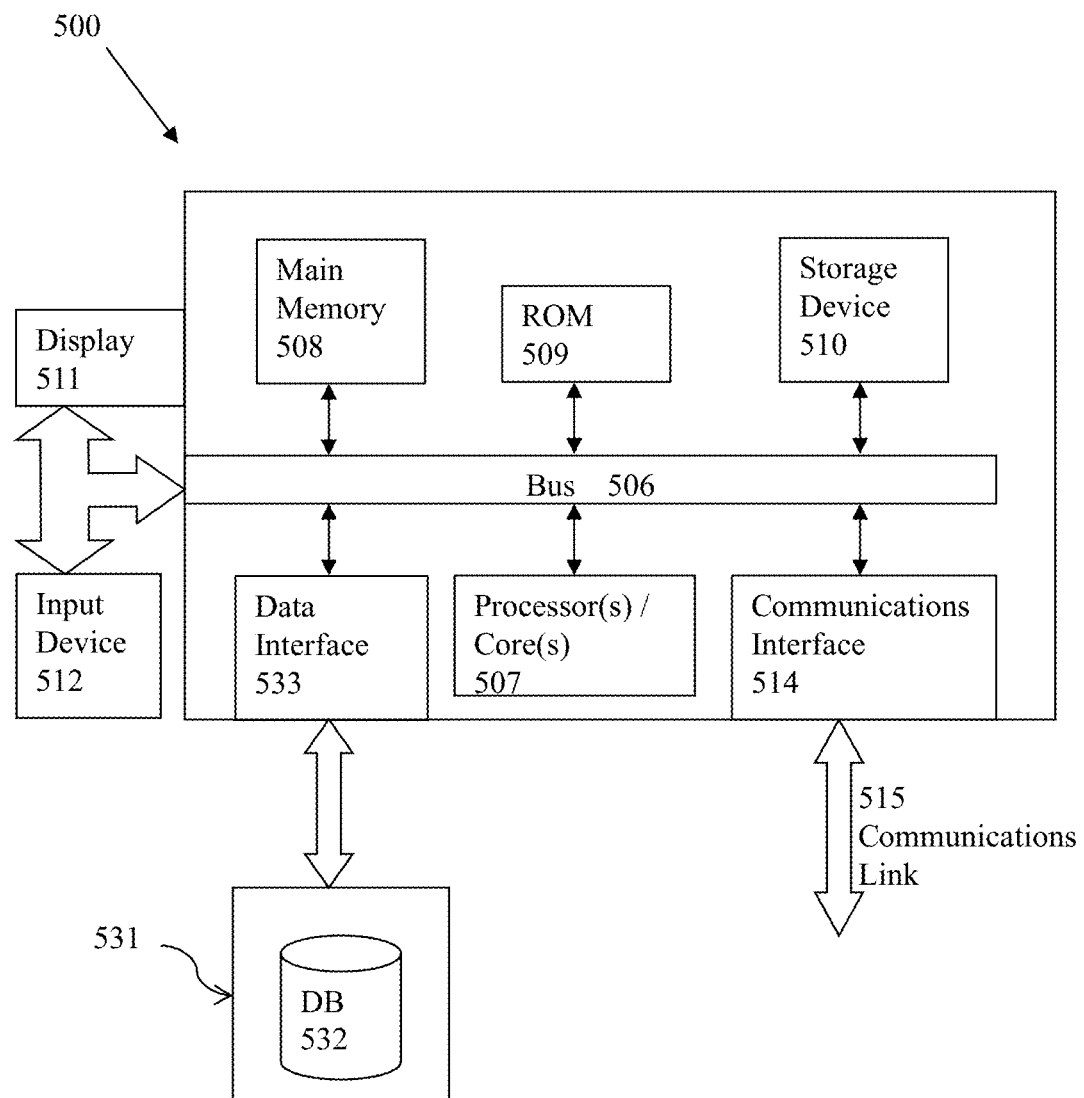
FIG. 5 illustrates a computerized system on which a method for implementing schematic driven extracted views for an electronic design may be implemented.

FIG. 5 illustrates a computerized system on which a method for implementing deadlock detection with formal verification techniques in an electronic design may be implemented. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown). The illustrative computing system 500 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 500 may include or may be a part of a cloud computing platform in some embodiments.

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program (e.g., application code) through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 that is readily accessible by the computer system 500. The computer system 500 communicates with the data storage system 531 through a data interface 533. A data interface 533, which is coupled to the bus 506 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing schematic driven extracted views for an electronic design, comprising:

identifying a schematic circuit component design represented by a schematic symbol from a schematic design of an electronic design;

identifying layout device information from a layout of the electronic design;

generating or updating, at an extracted view module stored at least partially in memory of and functioning in tandem with at least one microprocessor of a computing system, an extracted view at least by:

determining a model for the schematic circuit component design, the model comprising geometric information for the schematic circuit component design from the layout device information; and placing and interconnecting a model and a symbol representing the model in the schematic design based in part or in whole upon the layout device information; and updating the electronic design based in part or in whole upon results of performing one or more analyses on the extracted view.

2. The computer implemented method of claim 1, generating or updating the extracted view comprising:

representing a first set of schematic circuit component designs with a set of schematic symbols in the extracted view; and interconnecting the set of schematic symbols in the extracted view with schematic connectivity information or layout connectivity information.

3. The computer implemented method of claim 2, generating or updating the extracted view comprising:

representing a second set of schematic circuit component designs with a set of models in the extracted view; and interconnecting the set of models in the extracted view with the layout connectivity information but not the schematic connectivity information.

4. The computer implemented method of claim 1, updating the electronic design comprising:

identifying a circuit component design in the extracted view to be excluded from the one or more analyses; and determining whether excluding the circuit component design from the one or more analyses is appropriate based at least in part upon one or more models residing in the extracted view.

5. The computer implemented method of claim 4, updating the electronic design comprising:

determining electrical behaviors of the electronic design at least by performing at least one analysis of the one or more analyses on the extracted view that excludes the circuit component design from the at least one analysis.

6. The computer implemented method of claim 5, updating the electronic design comprising at least one of:

performing a layout-versus-schematic (LVS) check with the extracted view and a layout of the electronic design; or performing a schematic-versus-schematic (SVS) check with the extracted view and the schematic design of the electronic design.

7. The computer implemented method of claim 6, updating the electronic design comprising at least one of:

modifying the extracted view into a modified extracted view without regenerating the modified extracted view from the layout; or presenting model annotations or waveforms in the extracted view or in the modified extracted view.

8. The computer implemented method of claim 1, generating or updating the extracted view comprising:

identifying a graphical representation for representing the schematic circuit component design in the extracted view;

determining a structure for the extracted view; and generating or updating the extracted view based in part or in whole upon the graphical representation or upon the structure of the extracted view.

9. The computer implemented method of claim 8, identifying the graphical representation comprising:

determining whether a schematic symbol of the schematic circuit component design of the schematic design is to be placed in the extracted view based in part or in whole upon the layout device information;

when the schematic symbol of the schematic circuit component design of the schematic design is determined not to be placed in the extracted view, generating a copy of the schematic symbol; and modifying the copy into a modified schematic symbol based in part or in whole upon the layout device information.

10. The computer implemented method of claim 8, identifying the graphical representation comprising:

generating a new schematic symbol for the schematic circuit component design based in part or in whole upon the layout device information.

11. The computer implemented method of claim 8, determining the structure comprising:

identifying a layout hierarchical structure of a layout of the electronic design;

identifying a layout hierarchy at which a layout circuit component design corresponding to the schematic circuit component design is located from the layout hierarchical structure; and determining the structure of the extracted view based in part or in whole upon the layout hierarchical structure and the layout hierarchy.

12. The computer implemented method of claim 8, determining the structure comprising:

identifying a schematic hierarchical structure of the schematic design of the electronic design;

identifying a schematic hierarchy at which the schematic circuit component design is located from the schematic hierarchical structure; and determining the structure of the extracted view based in part or in whole upon the schematic hierarchical structure and the schematic hierarchy.

13. The computer implemented method of claim 8, generating or updating the extracted view based in part or in whole upon the graphical representation or upon the structure of the extracted view comprising:

identifying a schematic master cell corresponding to the schematic circuit component design;

identifying a plurality of schematic instances that are instantiated in the schematic design from the schematic master cell;

identifying a plurality of layout instances corresponding to the plurality of schematic instances and comprising a plurality of different physical implementations in a layout of the electronic design; and identifying one or more characteristics contributing to the plurality of different physical implementations of the plurality of layout instances.

14. The computer implemented method of claim 13, generating or updating the extracted view based in part or in whole upon the graphical representation or upon the structure of the extracted view comprising:

generating or identifying a plurality of different models for the plurality of different physical implementations based in part or in whole upon the one or more characteristics; and replacing the plurality of schematic instances in the schematic design with the plurality of different models at least by referencing connectivity information that comprises schematic connectivity information or layout connectivity information.

15. The computer implemented method of claim 14, generating or updating the extracted view based in part or in whole upon the graphical representation or upon the structure of the extracted view comprising:

generating a mapping data structure between at least two of the extracted view, the schematic design, the layout, the plurality of different models, the plurality of schematic instances, or the plurality of layout instances; and automatically populating one or more changes made in one of the extracted view, the schematic design, the layout, the plurality of different models, the plurality of schematic instances, or the plurality of layout instances into another one of the extracted view, the schematic design, the layout, the plurality of different models, the plurality of schematic instances, or the plurality of layout instances based at least in part or in whole upon the mapping data structure.

16. The computer implemented method of claim 15, generating or updating the extracted view based in part or in whole upon the graphical representation or upon the structure of the extracted view comprising:
identifying one or more subsequent changes in the extracted view after the extracted view has been generated;
committing the one or more subsequent changes to a persistent data structure; and
automatically populating the one or more subsequent changes in the extracted view to the schematic design or to the layout after the one or more subsequent changes have been committed to the persistent data structure.

17. A system for implementing schematic driven extracted views for an electronic design, comprising:
non-transitory computer accessible storage medium storing thereupon program code;
at least one micro-processor of one or more computing systems that is configured to execute the program code to identify a schematic circuit component design represented by a schematic symbol from a schematic design of an electronic design;
the at least one micro-processor of one or more computing systems that is further configured to execute the program code to identify layout device information from a layout of the electronic design;
an extracted view module that is stored at least partially in memory of the one or more computing systems, includes or functions in conjunction with the at least one micro-processor of the one or more computing systems, and is configured to execute the program code to generate or update an extracted view at least by:
determining a model for the schematic circuit component design, the model comprising geometric information for the schematic circuit component design from the layout device information; and
placing and interconnecting a symbol representing the model in the schematic design based in part or in whole upon the layout device information; and
the at least one micro-processor of one or more computing systems that is further configured to execute the program code to update the electronic design based in part or in whole upon results of performing one or more analyses on the extracted view.

18. The system for claim 17, the extracted view module further executing the program code to:
identify a graphical representation for representing the schematic circuit component design in the extracted view;
determine a structure for the extracted view; and
generate or update the extracted view based in part or in whole upon the graphical representation or upon the structure of the extracted view.

19. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing schematic driven extracted views for an electronic design, the set of acts comprising:
identifying a schematic circuit component design represented by a schematic symbol from a schematic design of an electronic design;
identifying layout device information from a layout of the electronic design;
generating or updating, at an extracted view module stored at least partially in memory of and functioning in tandem with at least one microprocessor of a computing system, an extracted view at least by:
determining a model for the schematic circuit component design, the model comprising geometric information for the schematic circuit component design from the layout device information; and
placing and interconnecting a symbol representing the model in the schematic design based in part or in whole upon the layout device information; and
updating the electronic design based in part or in whole upon results of performing one or more analyses on the extracted view.

20. The article of manufacture of claim 19, the set of acts further comprising:
identifying a graphical representation for representing the schematic circuit component design in the extracted view;
determining a structure for the extracted view; and
generating or updating the extracted view based in part or in whole upon the graphical representation or upon the structure of the extracted view.

* * * * *